United States Patent
Kyele et al.

(10) Patent No.: US 9,040,930 B2
(45) Date of Patent: May 26, 2015

(54) BEAM SENSING

(75) Inventors: Nicholas Roberts Kyele, Nairobi (KE);
Roelof Gozewijn Van Silfhout,
Stockport (GB)

(73) Assignee: THE UNIVERSITY OF MANCHESTER, MANCHESTER (GB)

( * ) Notice: Subject to any disclaimer, the term of this patent is extended or adjusted under 35 U.S.C. 154(b) by 1012 days.

(21) Appl. No.: 13/003,072

(22) PCT Filed: Jun. 18, 2009

(86) PCT No.: PCT/GB2009/001532
§ 371 (c)(1),
(2), (4) Date: Apr. 4, 2011

(87) PCT Pub. No.: WO2010/004258
PCT Pub. Date: Jan. 14, 2010

(65) Prior Publication Data
US 2011/0168903 A1 Jul. 14, 2011

(30) Foreign Application Priority Data

Jul. 9, 2008 (GB) .................................. 0812584.1

(51) Int. Cl.
*G01T 1/29* (2006.01)
(52) U.S. Cl.
CPC .................................... *G01T 1/2914* (2013.01)
(58) Field of Classification Search
USPC .................................. 250/363.06, 370.1, 371
See application file for complete search history.

(56) References Cited

U.S. PATENT DOCUMENTS

| 5,606,165 A | * | 2/1997 | Chiou et al. | ............. 250/363.06 |
| 5,821,541 A | * | 10/1998 | Tumer | ...................... 250/370.09 |
| 5,940,468 A | * | 8/1999 | Huang et al. | .................... 378/57 |

(Continued)

FOREIGN PATENT DOCUMENTS

| WO | WO 02/13517 | 2/2002 |
| WO | 2006/048871 A1 | 5/2006 |

OTHER PUBLICATIONS

International Search Report for PCT/GB2009/001532.
(Continued)

*Primary Examiner* — David Porta
*Assistant Examiner* — Djura Malevic
(74) *Attorney, Agent, or Firm* — Seed IP Law Group PLLC

(57) ABSTRACT

A particle beam sensor comprising: scattering means providing a surface for intercepting obliquely a path of a particle beam thereby to permit a scattering of particles from the particle beam by the scattering means; sensor means responsive to receipt of one or more said scattered particles to generate a sensor signal; aperture mask means arranged between the scattering means and the sensor means to present to the scattering means a screen opaque to said scattered particles and having at least one aperture through which an unobstructed view of the scattering means is provided to the sensor means, the aperture (s) thereby permitting selection of all of those particles scattered by the scattering means which may be used to form at the sensor means an image representative of at least a part of a foot print cast by the particle beam upon the scattering means. By scattering particles from a sectional area of a particle beam, scattered beam particles can be used more efficiently compared to existing techniques.

18 Claims, 14 Drawing Sheets

(56) References Cited

U.S. PATENT DOCUMENTS

| | | | |
|---|---|---|---|
| 6,596,994 B1* | 7/2003 | Alkire et al. | 250/336.1 |
| 7,515,681 B2* | 4/2009 | Ebstein | 378/19 |
| 7,767,949 B2* | 8/2010 | Perlman et al. | 250/208.1 |
| 7,831,024 B2* | 11/2010 | Metzler et al. | 378/150 |
| 2002/0075990 A1* | 6/2002 | Lanza et al. | 378/2 |
| 2006/0157640 A1* | 7/2006 | Perlman et al. | 250/208.1 |
| 2006/0261278 A1* | 11/2006 | Accorsi | 250/363.06 |
| 2008/0001069 A1* | 1/2008 | Perlman et al. | 250/208.1 |
| 2008/0025624 A1* | 1/2008 | Brady | 382/238 |
| 2008/0111069 A1* | 5/2008 | Notte | 250/282 |
| 2008/0118181 A1* | 5/2008 | Potuluri et al. | 382/275 |
| 2009/0289192 A1* | 11/2009 | Westerly et al. | 250/396 R |
| 2010/0104064 A1* | 4/2010 | Zelakiewicz et al. | 378/57 |
| 2010/0241396 A1* | 9/2010 | Rodenburg | 702/167 |
| 2010/0270462 A1* | 10/2010 | Nelson et al. | 250/252.1 |

OTHER PUBLICATIONS

Written Opinion of the International Searching Authority for PCT/GB2009/001532.

Van Silfhout et al: In situ high-speed synchrotron X-ray beam profiling and position monitoring, vol. 133, No. 1, (Dec. 20, 2006), pp. 82-87, Science Direct.

UK Intellectual Property Office; Search Report under Section 17 for Application No. GB0812584.1, Nov. 12, 2008.

Kwiatkowski et al, Development of Multi-Frame Detector for Ultra-Fast Radiography with 80MeV Protons, Nuclear Science Symposium Conference Record, Lyon, France Oct. 15-20, 2000, pp. 6-129-6-131, Piscataway, NJ.

Kyele et al., In Situ Synchrotron X-Ray Photon Beam Characterization, 2007, vol. 101, Issue 6, Journal of Applied Physics.

Kyele et al., Ray-Trace Calculations for In Situ X-Ray Beam Imaging, 2007, pp. 439-445, Journal of Synchrotron Radiation.

Kyele et al., A Transparent Two-Dimensional In Situ Beam-Position and Profile Monitor for Synchrotron X-Ray Beamlines, 2005, pp. 800-806, vol. 12, Journal of Synchrotron Radiation.

Extended European Search Report for EP Application No. 12191249.7, mailed May 10, 2013, 3 pages.

Van Silfhout, R. G., "Fast High-resolution 6D X-ray Micro-beam Characterisation", Details of Grant, EPSRC Reference: EP/E031994/1, The University of Manchester, Jun. 2007, 3 pages.

* cited by examiner

BEAM SENSING

The present invention relates to methods and apparatus for sensing a beam of particles, e.g. high-energy particles, for use in determining measurements of the beam.

High-energy particle beams may be produced for scientific, industrial or medical purposes. Examples include X-ray/γ-ray beams, carbon ion beams, or proton beams etc produced for use in experiments, measurements or medical diagnosis or treatment. Accurate knowledge or control of at least the position and/or direction of such a particle beam, in use, is desirable in order to allow control of the process or task for which the beam is used.

Current methods of particle beam sensing include techniques requiring interception of a particle beam with a scattering surface sufficiently opaque, or of generally low transparency, to permit particles to scatter from the beam in numbers sufficient to enable a scatter image or signal to be formed thereby. Un-scattered beam particles pass through the scattering surface and define the transmitted (attenuated) part of the particle beam. The scatter image or signal is then used as the means to determine beam position. For example, a scintillator sheet may be formed upon a scattering surface such that optical scintillations are formed by high-energy particles incident upon the scintillator, either directly from the particle beam or indirectly having scattered from the scatter surface. Optical imaging apparatus (e.g. lenses, a CCD operable at optical wavelengths) may be employed to record an optical image of the scatter image on the scintillator.

Changes in the position and/or brightness of the optical image reveal changes in the position and/or intensity of the particle beam.

However, in order to generate scintillations in numbers sufficient to produce an optical image of acceptable brightness, or of sufficiently high signal-to-noise ratio (S/N), a very significant proportion of the incident particle beam (e.g. 30%) must be caused to scatter at the scattering surface. This typically requires a scattering surface of such high opacity as to generally render the transmitted part of the particle beam unfit, during the sensing process, for the original use intended for the particle beam due to excessively high beam attenuation by the scattering surface.

In other words, existing beam sensing techniques are too obtrusive to be used to inconspicuously sense a particle beam. Desirably, the present invention may provide means for addressing at least some of these deficiencies.

At its most general, the invention proposed is to scatter particles from a sectional area of a particle beam, and to produce an image representative of the sectional area using an aperture mask and particles scattered from the beam, through the mask aperture(s). Most preferably, the particles used to form the image are all selected by action of the same aperture mask. Preferably, those scattered particles prevented from reaching the sensor means by the aperture mask means are all prevented by the same aperture mask. In this way, the aperture(s) of an aperture mask may be employed as an image forming means which may act directly upon scattered beam particles to form an image using those particles. This is a more efficient use of scattered beam particles as compared to existing techniques requiring initial generation of optical scintillation light and the use of intermediate optical image forming components (e.g. lenses), prior to forming any beam-representative images. A single aperture mask may be used or may be solely responsible for forming the representative image.

In a first of its aspects, the invention may provide a particle beam sensor comprising: scattering means providing a surface for intercepting obliquely a path of a particle beam thereby to permit a scattering of particles from the particle beam by the scattering means; sensor means responsive to receipt of one or more said scattered particles to generate a sensor signal; aperture mask means arranged between the scattering means and the sensor means to present to the scattering means a screen opaque to said scattered particles and having at least one aperture through which an unobstructed view of the scattering means is provided to the sensor means, the aperture(s) thereby permitting selection of all those particles scattered by the scattering means which may be used to form at the sensor means an image representative of at least a part of a foot print cast by the particle beam upon the scattering means.

The image representative of the foot print may be a direct image or may be an image convolved with the pattern of the aperture(s) of the aperture mask used to form it. Such a convolved image is representative of the footprint convolved within it. The properties (e.g. shape and structure) of the convolved image are intimately linked to the properties of the footprint. The aperture mask means may comprise an aperture mask presenting a single aperture which may be substantially a pinhole aperture of any selected geometrical shape (e.g. a circle, or a square etc), or which may be an extended geometrical shape such as a slit, or multiple joined slits (e.g. each being rectangular) collectively forming e.g. a cross or any other desired shape. Alternatively, the aperture mask means may comprise an aperture mask presenting a plurality of apertures, e.g. pinhole apertures and/or slits, arrayed in such a manner as to form, or comply with, a regular pattern such as a geometrical pattern, or a random pattern.

The advantage of using an extended aperture or multiple pinhole apertures is the increase in the number or intensity of scattered beam particles able to be selected by the aperture mask means for use in forming the representative image at the sensor means.

The efficient use of scattered beam particles, as provided by the invention, enables formation of brighter images representative of the particle beam footprint at a higher signal-to-noise ratio. This enables magnification of the representative image to be performed if desired. Magnification of an image conveying a given intensity (particles per square meter) may generally reduce the intensity of the image simply by increasing the area of the image in question. The greater the intensity of the unmagnified or original image, the greater the degree of magnification which may be permissible.

Most preferably, the aperture mask means is separated from the sensor means. Preferably the aperture mask means is separated from the scattering means. The particle beam sensor may be operable or arranged to produce the image representative of the footprint in a magnified form in a simple and direct way employing the geometry of the sensor. The at least one aperture(s) of the aperture mask means may preferably be in the unobstructed view of the sensor means.

The choice of the size, diameter or area defined by a given aperture of the aperture mask means is preferably selected according to a balance between sufficient size to enable a required intensity of scattered particles to reach the sensing means, yet imposing a suitable restriction on the size of the aperture(s) to enable a suitably high resolution of image to be obtained at the sensing means via the aperture(s). For example, for a circular aperture with a diameter d placed at a focal length L (i.e. distance between aperture and imaging plane, i.e. sensing means), the highest resolution of image may be obtained by enforcing the well-known relationship between d and L:

$$d^2 = 3.61 L \lambda$$

where λ is the wavelength of particles scattered through the aperture of diameter d. For example, for particles with a wavelength of 0.1 nm (e.g. 12.4 keV X-rays) and a focal length of L=25 mm, requires a circular mask aperture having a diameter of d=3 μm. Of course, other equivalent mathematical relationships may be derived between focal length L and relevant dimensions d of apertures having other than a circular shape, as will be readily apparent to the skilled person, and these may be employed to determine the optimal aperture dimensions in the aperture mask for achieving maximal image resolution.

For example, the separation (D) between the aperture mask means and the parts of the scattering means viewable by the sensor means through the aperture(s) of the aperture mask means, may differ from the separation (L) between the aperture(s) and the sensor means. Accordingly, the area at the sensor means able to be illuminated by particles scattered from the scattering means may differ from the area of the scattering means able to illuminate the sensor means with scattered particles (i.e. the beam footprint). This simple difference in separations imposes a magnification factor upon the image formed at the sensor means approximately proportional to the ratio of separations (L/D). Thus, without interposing any optical or other structures in the trajectory of scattered beam particles other than the aperture mask means, a magnified image may be formed. The particle beam sensor may be arranged to vary one or each of the separations L and D to provide a variable magnification.

The aperture mask means may be moveable relative to the scattering means such that the separation (D) between the aperture mask means and the parts of the scattering means viewable by the sensor means through the aperture(s) of the aperture mask means is adjustable thereby to adjust the scale of said image formed at the sensor means. The aperture mask means may be moveable relative to the sensor means, or vice versa, such that the separation (L) between the aperture mask means and the sensor means is adjustable thereby to adjust the scale of said image formed at the sensor means. This may be in addition to, or instead of, the aforesaid variability of D.

The aperture mask means preferably comprises a material highly absorbing with respect to particles from the beam (e.g. high atomic number, Z). A material having sufficiently good mechanical, chemical and thermal properties may be used to form the aperture mask. Stability of the shape, structure and opacity of the aperture mask in use is desirable. Examples include Tungsten, Tantalum, Platinum, Molybdenum. Good mechanical properties may include stiffness of the aperture mask body, good chemical properties may include chemical stability, inertness or low reactivity to the ambient conditions in which the mask is to be used. It is preferable that the properties, shape and structure of the aperture mask, and aperture(s) it defines, do not significantly change in use. Lead or Gold may be used as aperture mask material, and it may be preferable to place such aperture masks on a stiff carrier due to the relative malleability of these materials.

The scattering means may be arranged to scatter no more than 25%, more preferably no more than 15%, yet more preferably no more than 5% of beam particles (e.g. X-rays) incident upon it, and most preferably the scattering means is arranged to scatter no more than 3% to 5% of incident beam particles. Thus, most preferably, the scattering means, which is preferably a foil, transmits at least 95% to 97% or more of the beam particles it is intended to scatter. This transmission may depend upon the energy of the beam particles as well as the material and thickness of the scattering means (e.g. foil) through which un-scattered beam particles pass. For example, in respect of X-ray particle energies of about 7.5 keV to 30 keV, the scattering means may comprise any one of the following non-limiting examples: a Kapton™ ($C_{22}H_{10}N_2O_5$) scatter foil of 25 μm thickness; a Kapton™ ($C_{22}H_{10}N_2O_5$) scatter foil of 127 μm thickness; a Beryllium scatter foil of 150 μm thickness; a Carbon scatter foil of 50 μm thickness. Tungsten or stainless steel may be suitable for particle beams other than x-rays. The scatter foil is preferably formed of an amorphous solid (e.g. non-crystalline) in order not to produce preferential scattering angles (e.g. by diffractive processes). Suitable materials (in composite form or otherwise) typically have a low atomic number (Z) when used to scatter X-rays (e.g. atomic numbers equal to or less than that of Aluminium). Examples include Beryllium, Carbon, Kapton, and Mica. When other types of particle means are to be sensed (e.g. electrons or protons etc), then the scattering foil may preferably be formed from a material having a relatively higher atomic number. Whereas, for X-ray scattering, what generally dictates scattering efficiency is the number of electrons per atom of the material of the foil from which X-rays may scatter, when massive particles are to be scattered the relevant quantity is the size of the nucleus of the material of the foil from which beam particles may scatter.

A suitable upper value for the atomic number (Z) of the material of the scattering means (e.g. scatter foil) may be selected as follows.

When the particle beam in question comprises protons or carbon ions it is to be noted that while all materials scatter protons/carbon ions, high-Z materials scatter protons and carbon ions while minimising energy loss (i.e. scatter substantially elastically). Conversely, low-Z materials may be useful for degrading scattered particle energy (i.e. inelastic scatter) while minimising scatter. Suitable materials (either in composite form or otherwise) may have an atomic number equal to or less than that of gold.

When scattering visible photons (e.g. laser light), the scattering material is preferably a material having a transparency of 95% or higher.

When scattering electrons from an electron beam, it is preferable that the scattering means comprises a metal, such as a metal foil, with a minimal thickness. Metals are suitable since other target materials would tend to become charged by the incoming electrons of the beam. Suitable scattering means may comprise tungsten, tantalum or similar metals. The scatter foil material and thickness may be selected, according to incident beam particle energy (X-ray beams, electron beams, proton beams, carbon ion beams, photon beams), to have a sufficient scattering ability yet still have a sufficiently low impact upon the intensity of particle beam being sensed. The preferable scatter foil may be effectively transparent or quasi-transparent. This has the advantage of permitting the particle beam sensor to be used to sense or monitor a particle beam while the beam is in normal use without interrupting or significantly attenuating or degrading the beam.

The sensor means may comprise an array of pixel sensors arranged relative to the aperture mask means to provide a sensing array or surface upon which said image is formable, whereby each pixel sensor is responsive to receipt of a said scattered particle to generate a pixel sensor signal. Sensors arranged for direct particle (e.g. X-ray, proton) detection may be employed. Alternatively, a scintillator means may be employed in the sensor means to generate scintillation light in response to receipt of a scattered beam particle, the pixel sensors of the sensor means being arranged to detect such scintillation light. A fibre-optic plate may be used to optically couple such a scintillator to the pixel sensor array of the sensor to increase detection efficiency. Preferably, a semiconductor-based direct detection sensor may be employed (e.g.

direct detection sensors formed from Silicon, Gallium Arsenide, or Germanium may be used). Examples include CMOS sensors, CCDs and PIN diode arrays of a type such as would be readily appreciated by the skilled person. The advantage of using a direct detection sensor is the higher gain provided by such sensors—e.g. a directly-detected particle will typically produce a far greater sensor signal than will a scintillation photon produced by an indirectly detected particle.

The sensor array or surface may be substantially planar and adjustable to adjust the obliquity with which it is presented to the aperture mask means thereby to adjust the size of the image formed thereupon.

The said surface of the scattering means may be substantially planar and may be presented to the aperture mask means with an obliquity adjustable to adjust the obliquity with which it may be concurrently presented to a particle beam thereby to adjust the size of the beam foot print formed thereupon.

The scattering means may be pivotable about a pivot axis to enable adjustment of the obliquity thereof. The pivot axis of the scattering means may extend in a direction parallel to the plane of the said surface thereof and preferably through or across the mid region of that surface such that it may pass through or across the beam footprint formed by the scattering means in normal use of the apparatus. This means that a pivoting of the scattering means about its stationary pivot axis may result in a pivoting of the footprint about the same stationary axis. This may prevent a general translation of the footprint across the scattering means (e.g. foil) when the latter is pivoted to vary magnification.

The scattering means may be pivotable about a first axis to adjust its said obliquity, and the sensing surface of the sensor means may be pivotable about a second axis not parallel to (e.g. generally oblique, or wholly transverse to), or parallel to, the first axis to adjust its said obliquity.

When the angle of obliquity of the sensor means is changed by pivoting the sensor means about the second axis, an increase in image scale may be produced on the sensor surface. Pivoting the sensor in a sense which increases the obliquity of the plane of the sensor relative to its line of sight of the beam footprint, in use, produces an additional magnification:
  (a) in the dimension of the representative image parallel to the plane containing the beam axis when the second axis is parallel to the first axis; or
  (b) in the dimension of the representative image transverse to the beam axis when the second axis is not parallel to (e.g. wholly transverse to) the first axis.

The degree to which the second axis is oblique to the first axis determines the relative increase in image scale along the respective dimensions of the image parallel to and transverse to the plane containing the beam axis in use. It is to be noted that these methods permit increasing image scale upon the sensor means without changing the intensity of scattered particles. Conversely, changing the obliquity of the surface of the scattering means presented to the aperture mask (and, thus, to the particle beam) will typically change the intensity of scattered particles due to changes in the path length of beam particles within the scattering means (e.g. scattering foil).

As discussed above, the aperture mask means may comprise an extended aperture (e.g. a slit) and/or a plurality of apertures (e.g. pinhole apertures) which may be arranged to form a coded aperture mask.

The extended aperture(s) and/or the plurality of apertures (e.g. pinhole apertures) of the aperture mask means may be arranged as a linear slit(s) and/or a in a linear array, respectively, which may extend in a line substantially parallel with a row or a column of pixel sensors of the sensor means. For example, the aperture mask means may comprise one or more coded apertures e.g. in the form of a symmetrical cross formed by two linear slits bisecting each other at right angles. The arms of the cross preferably run parallel to a row or a column of pixel sensors of the sensor means.

This alignment of slit or aperture array with regard to sensor pixels may enable image data to be concentrated along pixel sensor rows and/or columns and thereby may permit a rapid acquisition of a sum signal generated by summing the signals from a given column or row of pixel sensor signals. Rapid and accurate detection of beam movement is possible using the resulting sum signals (which define profiles) which may determine the location of the centroid of the image on the sensor array, and changes thereof. For example, the location/coordinates of the crossing of spatially transverse profiles may serve to indicate the location/coordinates of the centroid of the image on the sensor array. Other methods may be used to this end.

The particle beam sensor may include a pixel signal processing means arranged to sum pixel sensor signals generated by pixel sensors along a said row or column of the sensor means and to provide the result as a summed pixel signal for use.

The particle beam sensor may include a signal processing means arranged or operable for de-convolving, according to the shape or pattern of the aperture(s) of the aperture mask, pixel sensor signals generated by the sensor means in response to the formation upon the sensor means of said image via said aperture mask thereby to generate image pixel values which collectively define an image of said foot print.

The signal processing means may be operable or arranged to determine the location/coordinates upon the pixel sensor array of the centre of mass, middle or centroid or the like, of the image formed upon it, or of the de-convolved version of such an image. This may be determined, for example, by identifying the pixel coordinates of the sensor pixel (or contiguous pixel group, e.g. of fixed size) producing, at a given time, the largest pixel sensor signal (or group average). Other known techniques of image processing may be employed such as would be readily apparent to the skilled person. The signal processing means may be operable or arranged generate particle beam control signals according to value of, or changes in the value of, the pixel coordinates of the centre of mass, middle or centroid or the like, of the image formed upon the pixel sensor array of the sensor unit. Thus, the signal processing means may be arranged either to passively monitor or sense a particle beam and/or to actively influence the production and/or control of properties of the particle beam (e.g. position, direction, intensity etc). The beam control signals may thus serve as a feed-back signal to the means for producing the particle beam thereby to enable that means to actively control, in real-time, the beam it produces.

In a second of its aspects, the invention may provide a particle beam generator apparatus operable to generate a beam of particles and including a particle beam sensor according to the invention in its first aspect in which the said surface of the scattering means is constructed and arranged to intercept obliquely the path in which the particle beam generator is arranged to direct the beam of particles to permit a scattering of particles therefrom.

The particle beam generator may include feedback means to control contemporaneously the beam generator to adjust properties of the particle beam according to sensor signals generated by the sensor means. The feedback means may include the signal processor means described above and arranged to generate beam control signals.

In a third of its aspects, the invention may provide a medical apparatus comprising a particle beam generator according to the invention in its second aspect.

In any aspect of the invention, the particle beam sensor may comprise a further sensor means responsive to receipt of one or more said scattered particles to generate a sensor signal; a further aperture mask means arranged between the scattering means and the further sensor means to present to the scattering means a screen opaque to said scattered particles and having at least one aperture through which an unobstructed view of the scattering means is provided to the further sensor means, the aperture(s) thereby permitting selection of all of those particles scattered by the scattering means which may be used to form at the further sensor means an image representative of at least a part of a foot print cast by the particle beam upon the scattering means. In this way, a single scattering means may serve two separate sensor/mask pairs—each being arranged to independently form an image from beam particles scattered towards them (respectively, in different directions) from the same scattering means.

The aperture mask means and sensor means may generally oppose the further aperture mask means and further sensor means across the scattering means. This enables the beam footprint to be sensed, monitored or imaged from opposite sides thereof. The scattering means may be a foil one face of which is visible to the sensor means via the aperture(s) of the aperture mask means, with the reverse face of the foil being visible to the further sensor means via the aperture(s) of the further aperture mask means. Preferably, the at least one aperture(s) of the further aperture mask means provides an unobstructed view of the scattering means which is in a direction generally opposite to that of the view of the scattering means provided to the other sensor means through the other aperture mask means.

The sensor means and aperture mask means may be arranged to monitor the position of the footprint upon the scattering means, while the further sensor means and further aperture mask means may be arranged concurrently to generate an image of the footprint formed upon the scattering means. Respective signal processing means in each of the sensor means and further sensor means may be arranged to determine, respectively, footprint position coordinates and footprint images contemporaneously in respect of the same footprint. The aperture(s) of the aperture mask means may differ from the aperture(s) of the further aperture mask means. The former may be a coded aperture mask, while the latter may be a different coded aperture mask or a pinhole aperture. Both may be pinhole apertures of different type (e.g. size, shape). The sensor means may be arranged to de-convolve pixel sensor signals according to the structure or pattern of the aperture(s) of the aperture mask means thereby to render from the pixel sensor signals associated with the representative image, data representing a de-convolved image of the footprint (e.g. may function as a footprint imager), while the further sensor may not de-convolve image data (e.g. may function as a beam position monitor). In this way, multiple concurrent sensing may be performed upon the beam footprint.

The particle beam generator of the invention in its second aspect may comprise such a plurality of aperture mask/sensor pairs.

In a fourth aspect, the invention may provide a particle beam sensor array comprising two or more separate particle beam sensors of the invention in any of its preceding aspects wherein the scattering means of each such particle beam sensor is arranged to enable concurrent oblique interception of a common particle beam by the respective separate scattering means of the separate particle beam sensors. This enables concurrent beam position measurements by the respective particle beam sensors of the array to provide position data with which the direction of the beam may be calculated. That is to say, the ability to determine the separated points of interception of the particle beam, at the separated particle beam sensors, relative to the coordinate system of the array, enables the direction of the beam to be determined relative to that coordinate system at least. The particle beam sensor array may include signal processing means arranged to receive concurrent pixel sensor signals from multiple particle beam sensors each conveying local beam footprint position data thereat, and to determine therefrom a measure or value or representation of the direction, and/or angle, and/or azimuth and/or altitude of the particle beam relative to a selected coordinate system.

The particle beam generator of the invention in its second aspect may comprise such a particle beam sensor array.

It will be appreciated that the forgoing aspects and descriptions of the invention realise a corresponding or equivalent method of particle beam sensing, and the invention encompasses such corresponding or equivalent methods.

For example, in a fifth of its aspects, the invention may provide a method for particle beam sensing comprising: providing scattering means and, with a surface thereof, intercepting obliquely a path of a particle beam thereby to permit a scattering of particles from the particle beam by the scattering means; providing sensor means responsive to receipt of one or more said scattered particles to generate a sensor signal and therewith so generating a sensor signal; providing aperture mask means arranged between the scattering means and the sensor means to present to the scattering means a screen opaque to said scattered particles and having at least one aperture through which an unobstructed view of the scattering means is provided to the sensor means; via the aperture(s), selecting all of those particles scattered by the scattering means to be used to form at the sensor means an image representative of at least a part of a foot print cast by the particle beam upon the scattering means.

The method may include providing a particle beam sensor according to the invention in any of its first to fourth aspects, and implementing the method according the fifth aspect of the invention using the particle beam sensor(s) accordingly.

The at least one aperture(s) of the aperture mask means may be in the unobstructed view of the sensor means. Most preferably, the aperture mask means is separated from the sensor means. Preferably the aperture mask means is separated from the scattering means.

The method may include changing the separation (D) between the aperture mask means and the scattering means viewable by the sensor means through the aperture(s) of the aperture mask means to change the scale of said image formed at the sensor means.

The method may include changing the separation (L) between the aperture mask means and the sensor means thereby to change the scale of said image formed at the sensor means.

The method may include providing the sensor means with a substantially planar array of pixel sensors defining a sensing surface, the method including changing the obliquity with which the sensing surface is presented to the aperture mask means thereby to change the size of the image formed thereupon.

The said surface of the scattering means may be substantially planar, and the method may include changing the obliquity with which surface of the scattering means is presented to the aperture mask means to change the obliquity with which it is concurrently presented to a particle beam thereby to change the size of the beam foot print formed thereupon.

The method may include pivoting the scattering means about a first axis to adjust its said obliquity, and/or pivoting the sensing surface of the sensor means about a second axis not parallel to (e.g. transverse to, or oblique to) or parallel to, the first axis to adjust its said obliquity.

The method may include providing the aperture mask means with an extended aperture(s) (e.g. a slit) and/or a plurality of apertures (e.g. pinhole apertures) which arranged in a line which extends substantially in parallel with a row or a column of pixel sensors of the sensor means, summing pixel sensor signals generated by pixel sensors along a said row or column of the sensor means, and providing the result as a summed pixel signal for use. The aperture mask means may be provided in the form of a coded aperture mask.

The method may include de-convolving, according to the shape or pattern of the aperture(s) of the aperture mask, pixel sensor signals generated by the sensor means in response to the formation upon the sensor means of said image via said aperture mask thereby generating image pixel values which collectively define an image of said foot print. The method may include determining the location/coordinates upon the pixel sensor array of the centre of mass, middle or centroid or the like, of the image formed upon it, or of the de-convolved version of such an image.

In a sixth of its aspects, the method may include controlling a particle beam generator including sensing a particle beam generated thereby according to the method of the invention in its fifth aspect, and controlling contemporaneously the particle beam generator to adjust properties of the particle beam according to sensor signals generated by the sensor means. The method may include generating particle beam control signals according to value of, or changes in the value of, the pixel coordinates of the centre of mass, middle or centroid or the like, of the image formed upon the pixel sensor array of the sensor unit.

The method may include providing further sensor means responsive to receipt of one or more said scattered particles to generate a sensor signal and therewith so generating a sensor signal; providing a further aperture mask means arranged between the scattering means and the further sensor means to present to the scattering means a screen opaque to said scattered particles and having at least one aperture through which an unobstructed view of the scattering means is provided to the further sensor means; via the aperture(s), selecting all of those particles scattered by the scattering means to be used to form at the further sensor means an image representative of at least a part of a foot print cast by the particle beam upon the scattering means.

The method may include sensing, monitoring or imaging the beam footprint from opposite sides thereof using the sensor means and further sensor means. The method may include monitoring the position of the footprint upon the scattering means using the sensor means, while concurrently and separately generating an image of the position of the footprint upon the scattering means using the further sensor means. Respective signal processing means in each of the sensor means and further sensor means may be arranged to determine, respectively, footprint position coordinates and footprint images contemporaneously in respect of the same footprint. The method may include de-convolving pixel sensor signals from the sensor means according to the structure or pattern of the aperture(s) of the aperture mask means thereby to render from pixel sensor signals associated with the representative image, data representing a de-convolved image of the footprint (e.g. for use in footprint imaging), while not de-convolving separately generated image data obtained using the further aperture mask means and further sensor means (e.g. for use in footprint position determination). In this way, multiple concurrent sensing may be performed upon the beam footprint.

The method may include providing a particle beam sensor array comprising two or more separate particle beam sensors of the invention in its first aspect, and concurrently obliquely intercepting a common particle beam using the respective separate scattering means of the separate particle beam sensors. The method may include making concurrent beam position measurements using the respective particle beam sensors of the array and providing position data with which the direction of the beam may be calculated. The method may include calculating said direction. The method may include receiving concurrent pixel sensor signals from multiple particle beam sensors, each conveying local beam footprint position data thereat, and determining therefrom a measure or value of representation of the direction, and/or angle, and/or azimuth and/or altitude of the particle beam relative to a selected coordinate system.

Embodiments of the invention will now be described, by way of example only, with reference to the following figures, of which:

Figure 14:
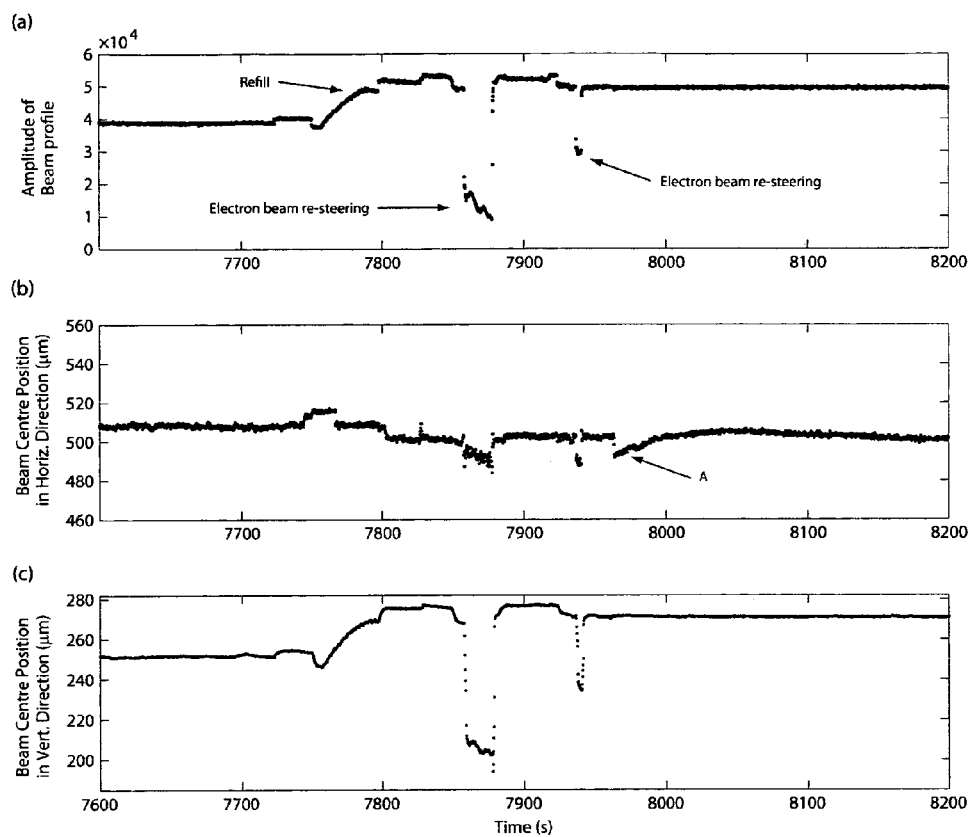
FIG. 14(a) shows the amplitude of the horizontal X-ray beam profile during a refill of a synchrotron machine producing the beam.
FIGS. 14(b) and 14(c) show the position of the centre of the beam in the horizontal and vertical direction, respectively.

FIGS. 15(a) and 15(b) show a 200 second window of a section of the time scan shown in FIG. 14.

In the drawings, like particles are assigned like reference symbols.

Figure 1A:
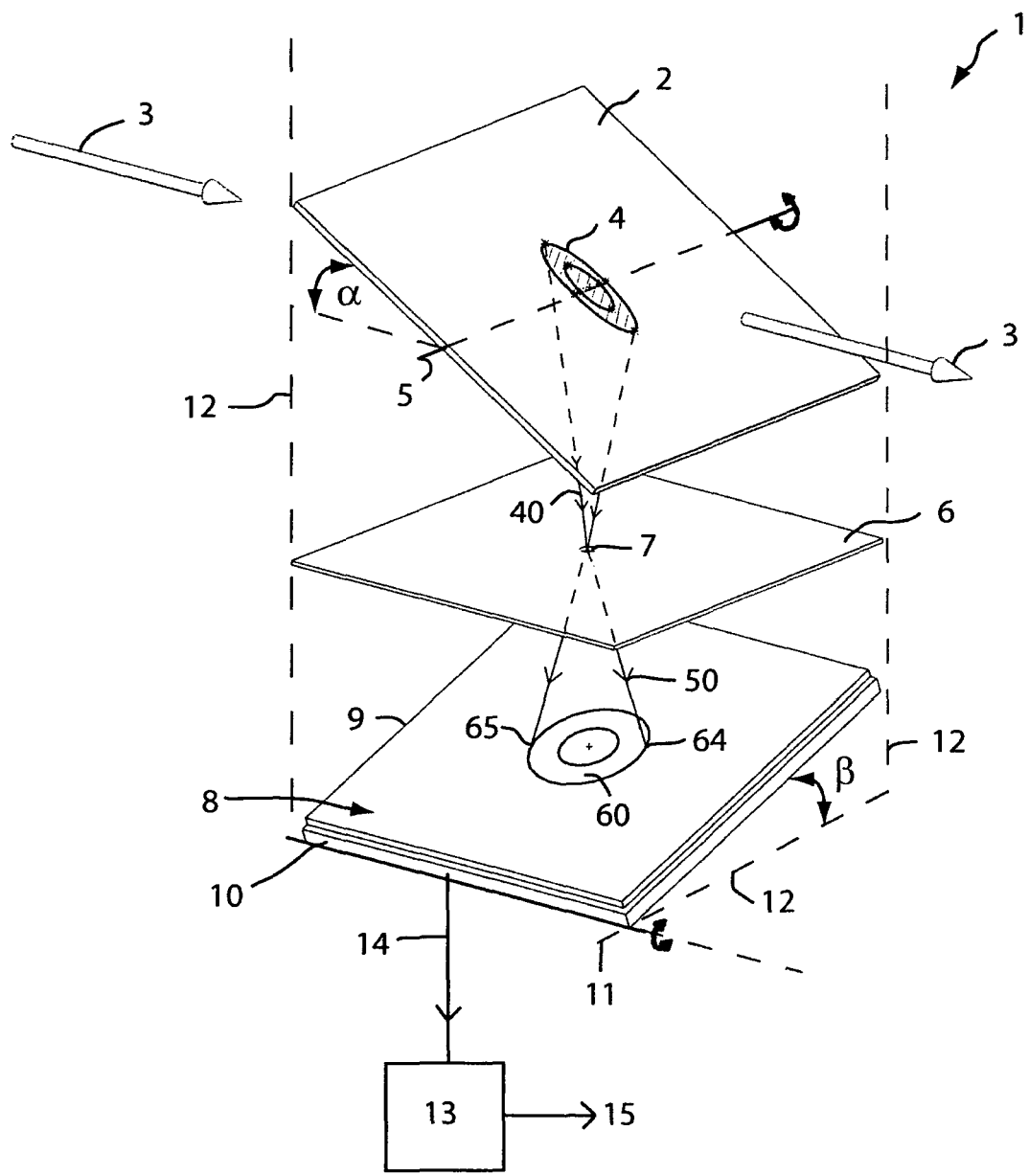
FIG. 1a illustrates schematically a particle beam sensor.

FIG. 1a schematically illustrates a particle beam sensor 1 for generating an image of a selected cross section of a particle beam 3. In the following example, the particle beam in question is a beam of X-ray particles, but the following description applies equally, in substance, to beams comprised of other particles.

Figure 13:
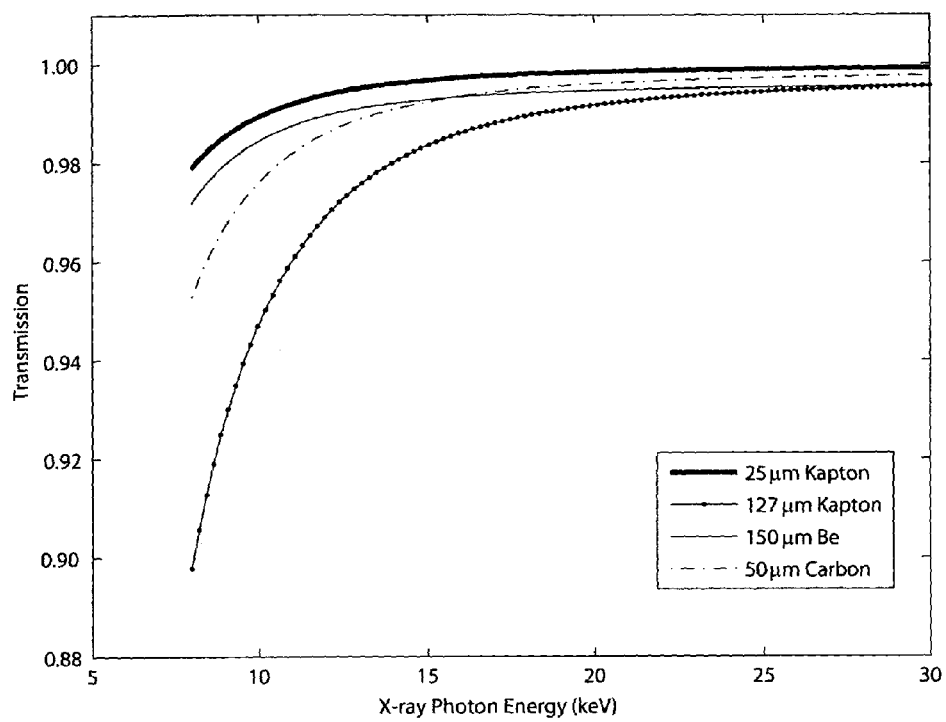
FIG. 13 illustrates the variation of scatter foil transmission of incident X-rays as a function of different X-ray particle energies, different scatter foil materials and different scatter foil thicknesses.

The particle beam sensor comprises a scattering foil 2 formed from a sheet of suitable material having uniform thickness of approximately 50 μm, positioned to present a planar surface obliquely intercepting the path of a beam of X-rays 3 thereby to permit X-rays from the beam to impinge upon the material of the scatter foil and therefrom to scatter with a small but finite and non-negligible probability. The thickness of the scatter foil is selected in conjunction with the atomic number of the element forming it, and X-ray particle energy, so as to present to the incident X-ray beam a scattering target having a scattering efficiency sufficient to scatter no more than about 5% of the X-rays incident upon it, and preferably from 3% to 5%. Put another way, the scatter foil preferably transmits at least 95%, or 97% of the X-ray beam it is intended to scatter. This transmission depends upon the energy of the X-ray particles as well as the material and thickness of the scatter foil. FIG. 13 illustrates the variation of scatter foil transmission of incident X-rays as a function of different X-ray particle energies, different scatter foil materials and different scatter foil thicknesses. Data is shown for X-ray particle energies of about 7.5 keV to 30 keV for each of: a Kapton™ ($C_{22}H_{10}N_2O_5$) scatter foil of 25 μm thickness; a Kapton™ ($C_{22}H_{10}N_2O_5$) scatter foil of 127 μm thickness; a Beryllium scatter foil of 150 μm thickness; a Carbon scatter foil of 50 μm thickness. Tungsten, stainless steel may be suitable for scattering particle beams other than X-rays.

The scatter foil may be selected, according to X-ray particle energy within the beam, to be a suitable material of suitable thickness as to have a sufficient scattering ability, yet still have a minimal impact upon the intensity of X-ray beam being sensed. The preferable scatter foil may be considered in a practical sense, effectively transparent. This has the advantage of permitting the particle beam sensor to be used to sense or monitor a particle beam while the beam is in normal use without significantly interrupting the beam.

This principle applies to the use of the invention, in other embodiments of the invention, for sensing particle beams other than X-ray beams, such as electron beams, proton beams, carbon ion beams, laser beams (photons). It will be appreciated that the effective thickness of the scatter foil, as "seen" by a beam particle, will vary according to the angle (α) at which the scatter foil is inclined to the path of the particle in question. Thus, a relatively lower foil thickness may be most suitable for use at large foil inclinations (α small or close to 180 degrees), whereas a relatively thicker foil may be preferable at low foil inclinations (α closer to 90 degrees).

Consequently, the scatter foil is selected to cause an X-ray footprint 4 to be generated at the scattering foil representing a desired oblique cross-section of the profile of the X-ray beam determined according to the angle of obliquity (α) with which the plane of the scatter foil is inclined to the axis of the X-ray beam.

The scatter foil 2 is pivotable about an axis 5 to adjust the angle of obliquity thereby to adjust the length of the footprint in question. The pivot axis extends in a direction confined to (or parallel to) the plane of the scatter foil and preferably across or through the mid region of the scatter foil such that it may pass across or through the beam footprint formed by the scatter foil in normal use of the apparatus. This means that a pivoting of the scatter foil about its stationary pivot axis will result in a pivoting of the footprint about the same stationary axis. This prevents general translation of the footprint across the scatter foil when the latter is pivoted to vary magnification.

The particle beam sensor includes a sensor unit 8 comprising a CMOS pixel sensor array 10 extending over which is a scintillator and fibre-optic plate 9 substantially co-planer with the pixel sensing surface defined by the pixel array of the CMOS device. The fibre-optic plate couples scintillation light generated in the scintillator plate (by scattered X-rays) onto the pixel array. In other embodiments, the sensor unit comprises a pixel sensor array arranged to directly sense X-ray photons without use of a scintillator and fibre-optic plate.

An aperture mask 6 is located between the scatter foil 2 and the sensor unit 8 and comprises a sheet of material of sufficient thickness and/or atomic number to be substantially opaque to X-rays elastically scattered from the X-ray beam 3 by the scatter foil 2. Typically, a highly absorbing material (e.g. high atomic number, Z) with good mechanical, chemical and thermal properties may be used to form the aperture mask. Examples include Tungsten, Tantalum, Platinum, Molybdenum. Good mechanical properties may include stiffness of the aperture mask body, good chemical properties may include chemical stability, inertness or low reactivity to the ambient conditions in which the mask is to be used. It is preferable that the properties, shape and structure of the aperture mask, and aperture(s) it defines, do not significantly change in use. Lead or Gold may be used as aperture mask material, and it may be preferable to place such aperture masks on a stiff carrier due to the relative malleability of these materials.

A single pinhole aperture 7 is formed through the sheet defining the aperture mask. The pinhole aperture is circular in shape and has a diameter of 50 μm.

The sensor unit 8 is pivotable about an axis 11 substantially transverse to the axis 5 about which the scatter foil is pivotable so as to permit adjustment of the angle of obliquity (β) with which the plane of the sensor (e.g. surface of the scintillator sheet 9, or the surface of the sensor array) is presented to the pinhole aperture 7.

The sensor unit 8 enjoys an unobstructed view of the pinhole aperture, and through the pinhole aperture enjoys an unobstructed view of the scatter foil 2. Consequently, X-rays scattered elastically from the scatter foil 2 thereby defining, in part, the footprint 4 of the X-ray beam, may pass through the aperture mask 6 only via the pinhole aperture 7 formed therein and subsequently impinge upon the material of the scintillator sheet to generate scintillation there. Pixel sensors of the CMOS pixel sensor array are operable to subsequently generate pixel sensor signals in response to scintillation flashes occurring within those parts of the scintillation sheet in view of a respective pixel sensor via the fibre-optic plate.

Sensors arranged for direct X-ray detection may be employed in alternative embodiments thereby omitting the scintillator and fibre-optic plate. Preferably, a semiconductor-based direct detection sensor may be employed (e.g. direct detection sensors formed from Silicon, Gallium Arsenide, or Germanium may be used). Examples include CMOS sensors, CCDs and PIN diode arrays of a type such as would be readily appreciated by the skilled person. The advantage of using a direct detection sensor is the higher gain provided by such sensors—e.g. a directly-detected particle will typically produce a far greater sensor signal than will a scintillation photon produced by an indirectly detected particle.

Pixel sensor signals are subsequently transmitted, via a signal transmission line 14, to a signal processing unit 13 optionally for compilation into a data set representing the entire image 60 of the X-ray particle beam footprint 4 formed on the sensing surface of the sensor unit 8 by the pinhole aperture 7 of the aperture mask 6, and/or for processing to determine the location/coordinates upon the pixel sensor array of the centre of mass, middle or centroid or the like, of the image formed upon it. Image data processing may also be performed by the signal processor unit, such as de-convolution as discussed below.

The output data signal 50 comprises image data representing the image 60 formed on the sensor unit 8 (or a de-convolved image as required), and/or beam control signals for use in controlling the generator of the X-ray particle beam 3 in such a way as to adjust one or more properties of the X-ray beam. The beam intensity, intensity profile, position or other properties may be controlled according properties of the image so produced—such as image pixel values representative of scattering intensity, and image position, or change in position, upon the image sensor. For example, the beam control signals may be generated by the signal processing unit according to value of, or changes in the value of, the pixel coordinates of the centre of mass, middle or centroid or the like, of the image formed upon the pixel sensor array of the sensor unit.

The scattering foil, aperture mask, and sensor unit of the beam sensor 1 are arranged in succession upon a frame 12 (shown schematically only) which includes the axes (5, 11) about which the scatter foil and sensor unit are respectively pivotable as described above. The aperture mask 6 is movably attached to the frame 12 in order to permit the separation (D) between the aperture mask and the scatter foil, and the separation (L) between the aperture mask and the sensor unit to be adjusted concurrently. The effect is to adjust the scale of the image 60 formed upon the sensor unit and thereby to adjust the magnification factor thereof. This also adjusts the factor by which changes on position of the footprint of the beam are magnified as changes in the position of the image representative of the footprint on the sensor unit.

Figure 2:
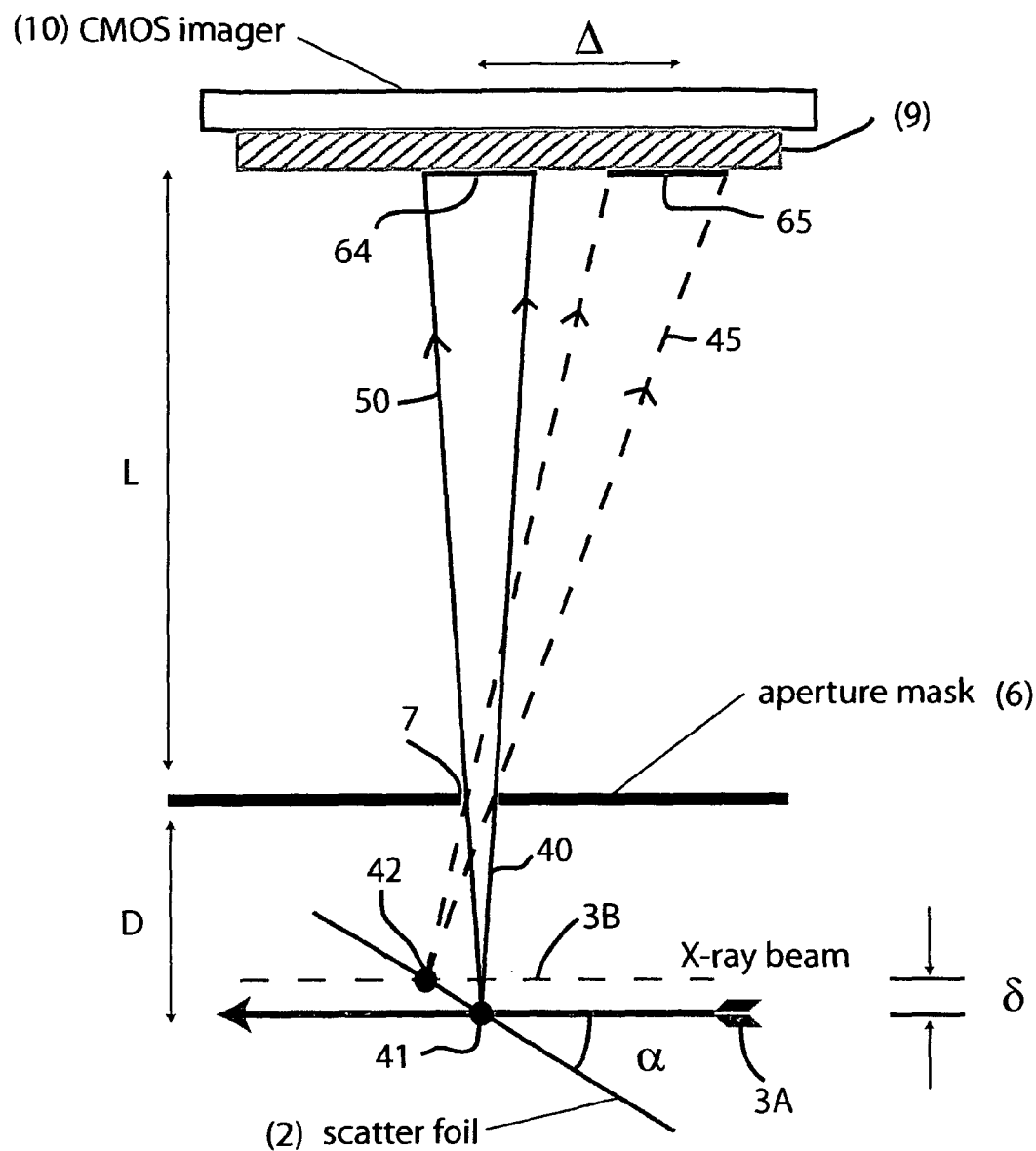
FIG. 2 illustrates schematically the particle beam sensor of FIG. 1 in cross section in which the angle of obliquity of the sensor surface (9, 10) is substantially zero degrees.

FIG. 2 schematically illustrates schematically, in a cross sectional view, the scatter foil, the aperture mask and the sensor unit together with two separate X-ray beam features (3A, 3B) extending in parallel, but separated by a separation δ. The scatter foil is presented to the paths of the X-ray beam features at an angle α relative to their paths. The plane of the scintillator sheet 9 of the sensor unit 8 is presented to the aperture mask directly (i.e. at an angle of obliquity β of zero degrees).

In a first discussion, the two separate X-ray features represent extremities of the X-ray beam 3 incident upon the scatter foil 2. As such, the parts (41, 42) of the scatter foil intercepting the paths of those extreme beam parts produce, by scattering from the foil, two respective extremities (41, 42) of the X-ray beam footprint.

A first pencil of X-rays 50 scattered from the scatter foil at the first foot print extremity 41 propagates to the scintillator sheet 9 of the sensor unit 10, having passed through the pinhole aperture 7 of the aperture mask, and generates a scintillation at a first extreme region 64 of an image 60 of the beam foot print 4. The pinhole aperture is separated from the first foot print extremity by a distance D.

Similarly, a second pencil of X-rays 45 scattered from the scatter foil at the second foot print extremity 42 propagates to the scintillator sheet 9 of the sensor unit 10, having passed through the pinhole aperture 7 of the aperture mask, and generates a scintillation at a first extreme region 65 of an image 60 of the beam foot print 4. The pinhole aperture is separated from the second foot print extremity by a distance D-δ.

In each case the aperture mask is separated from the scintillator sheet by a distance L. Divergence in each of the two separate pencils of scattered X-rays is shown in exaggerated form in FIG. 2. However, it is to be noted that the separation between the two extreme regions (64, 65) of the image 60 of the foot print at the sensor unit exceeds the separation between the corresponding respective foot print extremities at the scattering foil 2.

This represents a magnification of the image 60 of the foot print 4 of the X-ray beam. It can be shown that, for a thin foil approximately acting as a scattering surface, the magnification (M=Δ/δ) imposed by the geometry of the particle beam sensor 1, can be written as:

$$M \approx \left(\frac{L}{D}\right)\left(\frac{1}{\tan(\alpha)}\right)\left(\frac{D}{D-\delta}\right).$$

For values of δ small relative to the value of D, this can be approximated accurately as:

$$M \approx \left(\frac{L}{D}\right)\left(\frac{1}{\tan(\alpha)}\right)$$

Thus, two magnification factors take effect in magnifying the foot print of the X-ray beam on the scatter foil. The first factor produces an elongation of the foot print by presenting the scatter foil to the X-ray beam at an oblique angle α<90 degrees, rather than directly (i.e. α=90 degrees). This elongation is limited in its effect to the direction parallel to the plane containing the angle of obliquity, α. The second factor is the effect produced by the greater separation (L) between the aperture mask and the sensor unit, as compared to the separation (D) between the location of the beam foot print extremities on the scatter foil and the aperture mask (i.e. L/D>1). The second factor is spatially uniform in its effect across the image, whereas the first factor takes effect only along one dimension. By increasing the angle of obliquity (β) with which the scintillator sheet is presented to the aperture mask, one may impose a magnification along a dimension of the image transverse to that associated with the first magnification factor. Accordingly, the magnification factor in that transverse direction may be given by:

$$M \approx \left(\frac{L}{D}\right)\left(\frac{1}{\cos(\beta)}\right)$$

If $1/\tan(\alpha)=1/\cos(\beta)$ then this magnification factor becomes uniformly applicable across the whole image of the beam footprint.

Figure 1B:
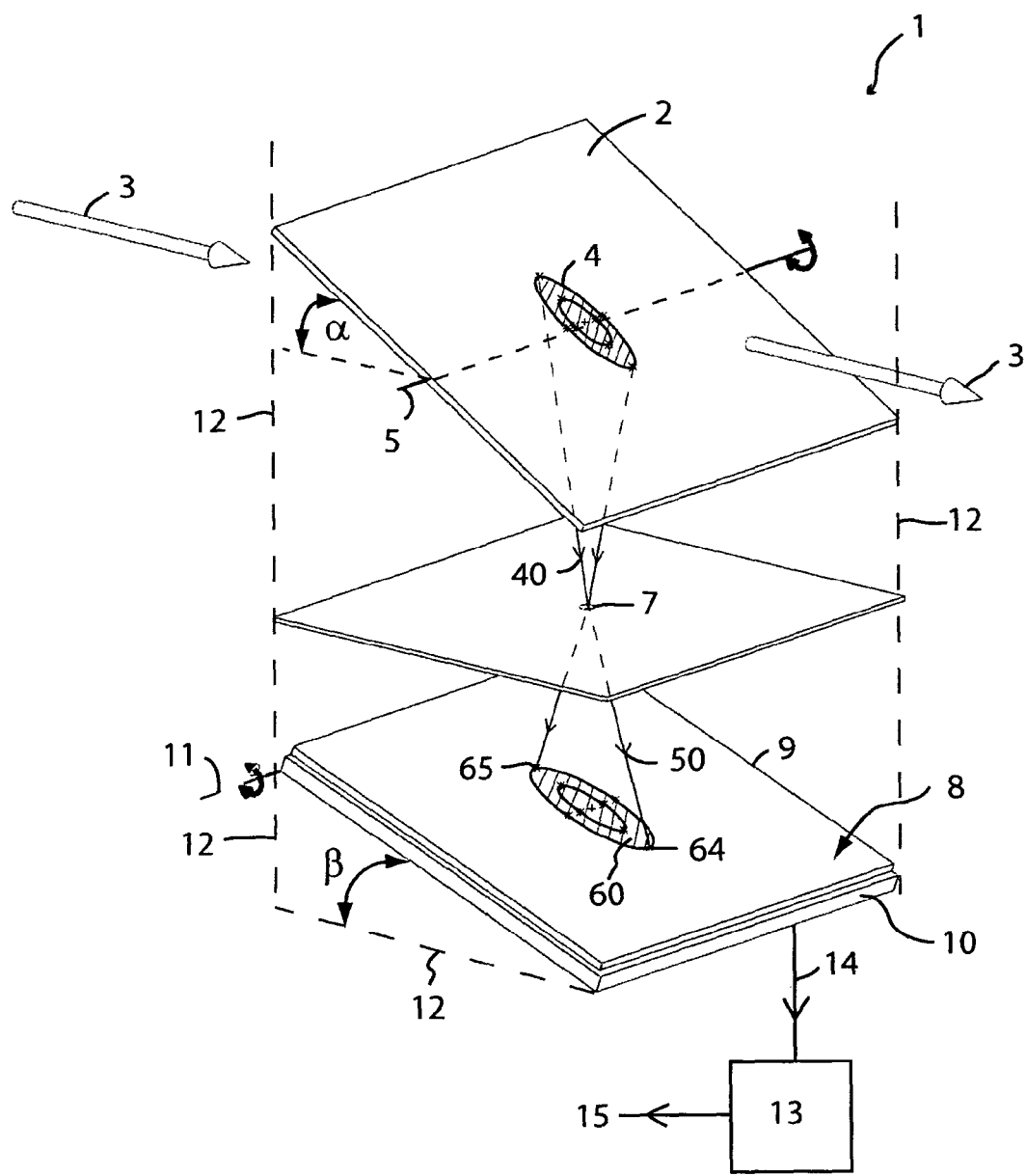
FIG. 1b illustrates schematically a particle beam sensor.

In an alternative embodiment shown in FIG. 1b, the sensor unit 8 is pivotable about an axis 11b substantially parallel to the axis 5 about which the scatter foil is pivotable so as to permit adjustment of the angle of obliquity ($\beta$) with which the plane of the sensor (e.g. surface of the scintillator sheet 9) is presented to the pinhole aperture 7. When the angle of obliquity is changed in a sense which increases the obliquity of the plane of the sensor relative to its line of sight of the beam footprint, in use, an additional magnification is provided in the dimension of the representative image parallel to the plane containing the angles of obliquity ($\alpha$) as follows.

$$M \approx \left(\frac{L}{D}\right)\left(\frac{1}{\tan(\alpha)}\right)\left(\frac{1}{\cos(\beta)}\right)$$

It is to be noted that, in a second discussion, the two separate X-ray features (3A, 3B) indicated in FIG. 2, represent different, separate footprints each formed by the same single X-ray beam 3 incident upon the scatter foil 2 at different positions at different times. As such, the movement of the foot print of the X-ray beam in the scatter foil reveals directly a movement of the position and/or direction of the X-ray beam over time.

According to the analysis of magnification given above, which is equally applicable to the current discussion, the separation ($\delta$) between the two successive locations (3A, 3B) of the X-ray beam, results in a corresponding separation ($\Delta$) between the locations of the images (64, 65) of the respective foot prints cast upon the surface of the scintillator sheet 9. The ratio of these two separations ($\Delta/\delta$) defines the magnification (M) imposed by the beam sensor apparatus and is given by $$M \approx \left(\frac{L}{D}\right)\left(\frac{1}{\tan(\alpha)}\right)\left(\frac{D}{D-\delta}\right).$$

Again, by increasing the angle of obliquity ($\beta$) with which the scintillator sheet is presented to the aperture mask, one may impose a magnification along a dimension transverse or parallel to that associated with the magnification factor, as discussed above with reference to FIG. 1a (transverse) and FIG. 1b (parallel). Accordingly, the magnification factor in the transverse direction may be given by:

$$M \approx \left(\frac{L}{D}\right)\left(\frac{1}{\cos(\beta)}\right)$$

Whereas, the magnification factor in the parallel direction may be given by:

$$M \approx \left(\frac{L}{D}\right)\left(\frac{1}{\tan(\alpha)}\right)\left(\frac{1}{\cos(\beta)}\right)$$

Thus, the beam sensor may serve not only to magnify the foot print of the beam to enable a detailed view or measurement of X-ray beam profile properties, but may serve to magnify changes in the position of the beam enabling accurate monitoring of this of quantity.

The material of the scatter foil is selected to be sufficiently thin to avoid excessive scattering, not too thin to lack sufficient rigidity. The scatter foil is preferably formed of an amorphous solid (e.g. non-crystalline) in order not to produce preferential scattering angles (e.g. by diffractive processes). Suitable materials typically have a low atomic number (Z) when used to scatter X-rays (e.g. atomic numbers equal to or less than that of Aluminium). Examples include Beryllium, Carbon, Kapton, Mica. When other types of particle means are to be sensed (e.g. electrons or protons etc), then the scattering foil may preferably be formed from a material having a relatively higher atomic number.

This enables a balance to be made between generating sufficient scattering events at the scatter foil to provide a foot print viewable by the sensor unit 8 through the pinhole aperture, yet not deplete the beam of X-rays appreciably. The result is an effectively transparent X-ray beam sensor/monitor and imager which can be employed to sense or image an X-ray beam substantially without detriment to the concurrent and continued use of that beam for other intended purposes.

Whereas, for X-ray scattering, what dictates scattering efficiency is the number of electrons per atom of the material of the foil from which X-rays may scatter, when massive particles are to be scattered the relevant quantity is the size of the nucleus of the material of the foil from which beam particles may scatter.

Figure 3:
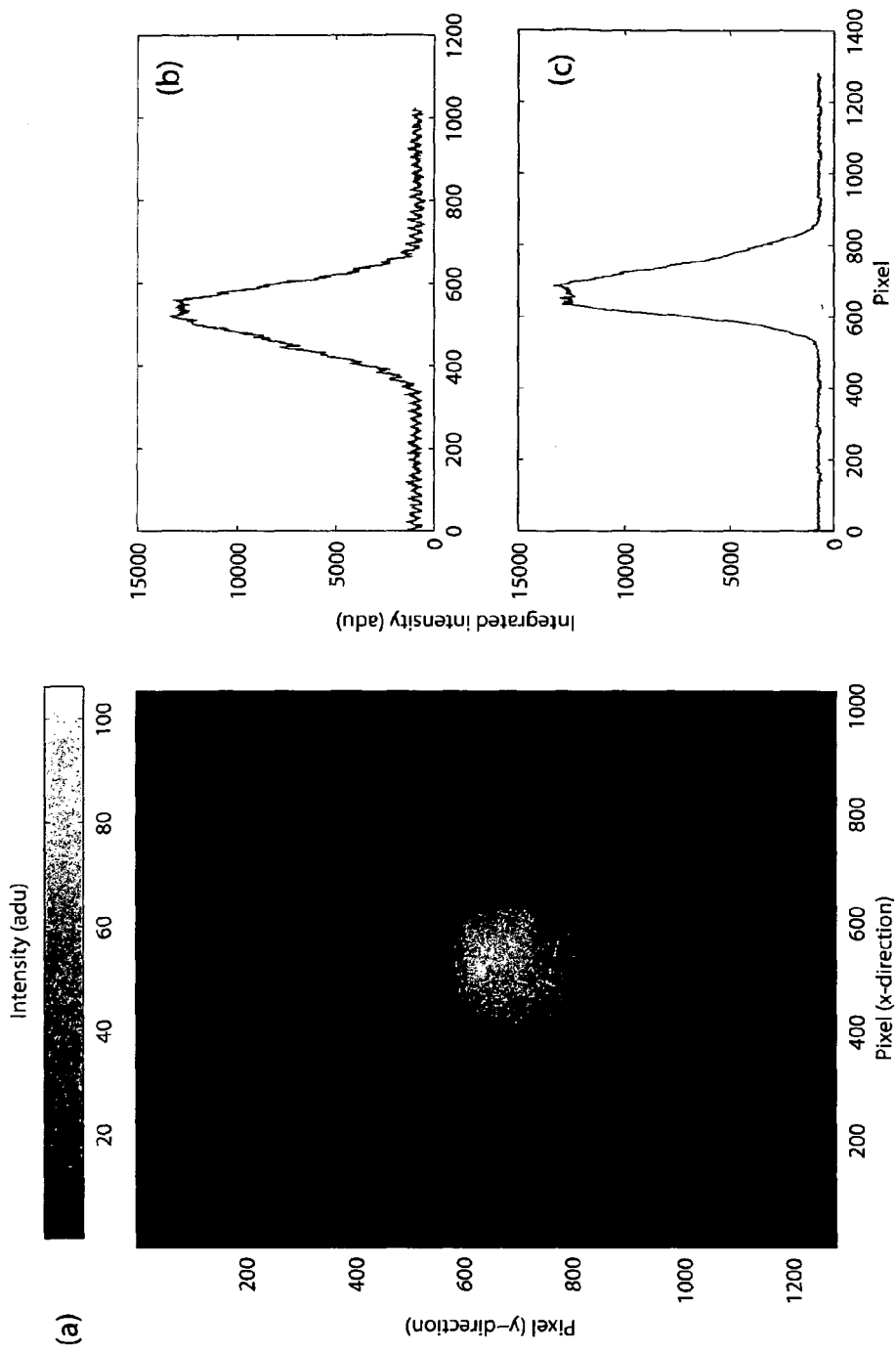
FIG. 3(a) illustrates an image obtained via the particle beam sensor of FIG. 1.
FIG. 3(b) illustrates a line profile of the image of FIG. 3(a)
FIG. 3(c) illustrates a line profile of the image of FIG. 3(a) in a direction transverse to that associated with the line profile of FIG. 3(b)

FIG. 3 shows a series of three graphs associated with an X-ray beam footprint produced using to a particle beam sensor of the type illustrated in FIG. 1, employing an aperture mask 6 containing a single pinhole aperture 7 with a diameter of 50 µm.

The aperture mask used in the experiment resulting in this data was a 0.2 mm-thick molybdenum sheet with a 50 µm pinhole aperture (single aperture) positioned below the scatter foil perpendicular to the direction of travel of the X-ray beam being monitored. The aperture was located at a distance D=5 mm below the scatter foil. The CMOS imager was placed behind the aperture to directly detect the scattered X-ray photons that pass through the pinhole aperture. The scatter foil was a 127 µm thick Kapton foil.

This CMOS imager received an enlarged image 60 of the part of the foot print visible through the aperture. Changes in the position of the X-ray beam were magnified by the aperture ratio L/D as any beam displacement 6 is magnified by the factor L/(D×tan($\alpha$)). The imager was positioned at a distance L=11 mm behind the pinhole aperture and a scintillator was placed on a fibre optic plate attached to the imager to couple scintillation light to CMOS image pixel sensors of the CMOS sensor. Thus, L/D=2.2. The angle $\alpha$ was 23.8 degrees.

The high intensity of scattered X-ray radiation from the scatter foil resulted in high X-ray photon intensity at the sensor position. Once corrected for background radiation the images (shown in FIG. 3) clearly show scattering from Kapton™ ($C_{22}H_{10}N_2O_5$). The intensity is given in analogue-to-digital (ADU) units.

FIG. 3a illustrates the magnified image of the foot print of an X-ray beam constructed from pixel sensor signals generated by the CMOS image sensor 10 in response to formation of a magnified image 60 of a beam foot print 4 by the processes described above. The image is visually coded to represent, using differing grey-scale values, the spatial distribution of differing pixel signal values generated across the pixel sensor array of the CMOS image sensor, thereby illustrating the spatial distribution of scattered X-ray intensity at the foot print 4 on the scatter foil 2 and, by inference, the cross-sectional distribution of X-ray intensity in the X-ray beam. FIGS. 4a, 5a, 8 and 9 are similarly coded, and are discussed below. Thus, the apparatus of FIG. 1 serves also as an X-ray beam profiler.

FIGS. 3b and 3c illustrate the horizontal (x-direction of FIG. 3a) and vertical (y-direction of FIG. 3a) intensity profiles, respectively, of the X-ray beam image of FIG. 3a. The profile of FIG. 3b was obtained by summing the pixel values associated with a common selected column of pixel sensors of the CMOS image sensor 10 to produce a data point on the graph. This process was repeated for all columns of pixel sensors. The x-axis coordinate of each data point on the graph of FIG. 3b records the x-axis coordinate of the selected column, and the y-axis coordinate of each data point records the value of the sum of pixel sensor signals for that column of pixel sensors.

The profile of FIG. 3c was obtained by summing the pixel values associated with a common selected row of pixel sensors of the CMOS image sensor 10 to produce a data point on the graph. This process was repeated for all rows of pixel sensors. The x-axis coordinate of each data point on the graph of FIG. 3b records the x-axis coordinate of the selected row, and the y-axis coordinate of each data point records the value of the sum of pixel sensor signals for that row of pixel sensors.

Figure 4:
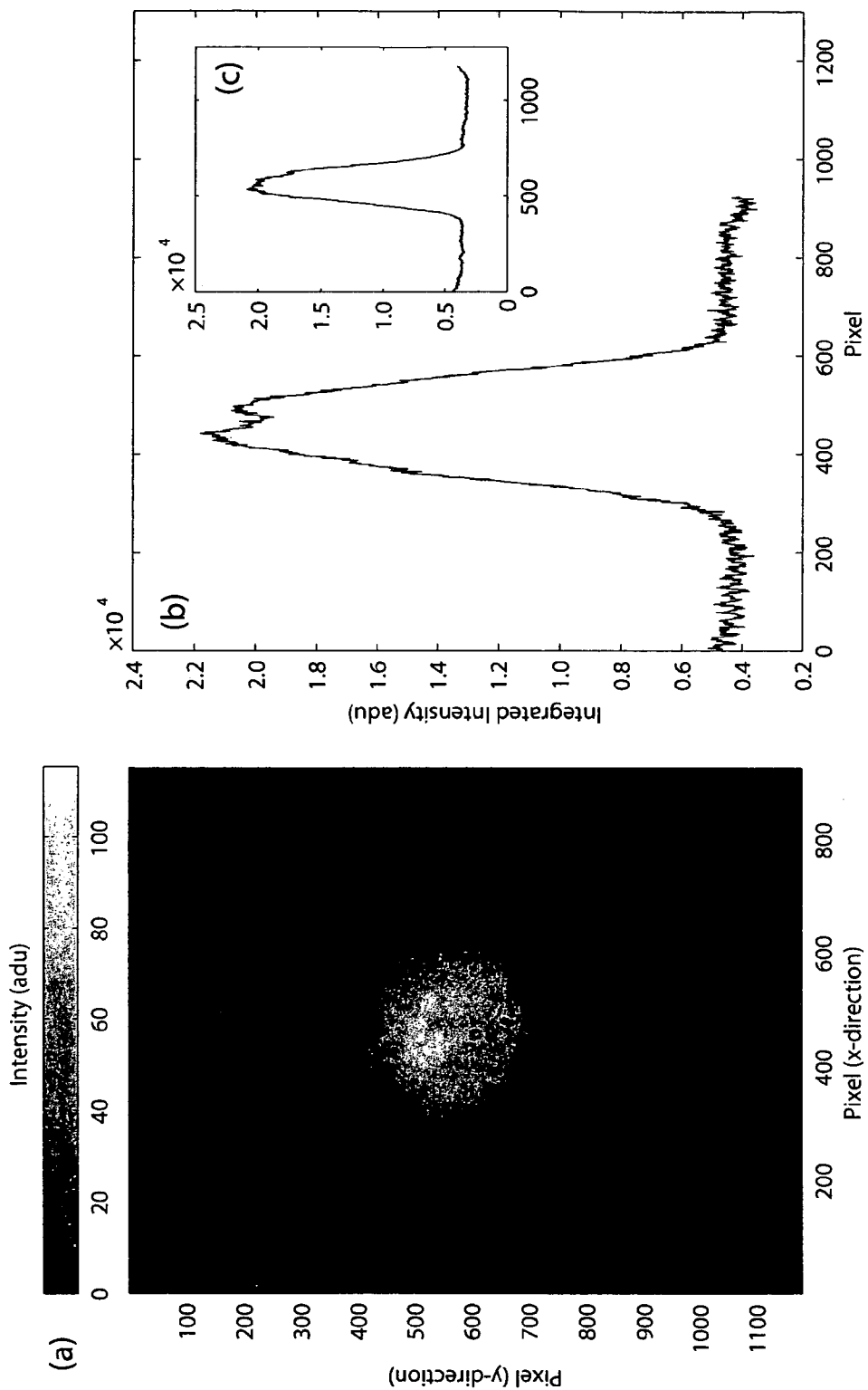
FIG. 4(a) illustrates an image obtained via the particle beam sensor of FIG. 1 with a different magnification.
FIG. 4(b) illustrates a line profile of the image of FIG. 4(a)
FIG. 4(c) illustrates a line profile of the image of FIG. 4(a) in a direction transverse to that associated with the line profile of FIG. 4(b)
Figure 5:
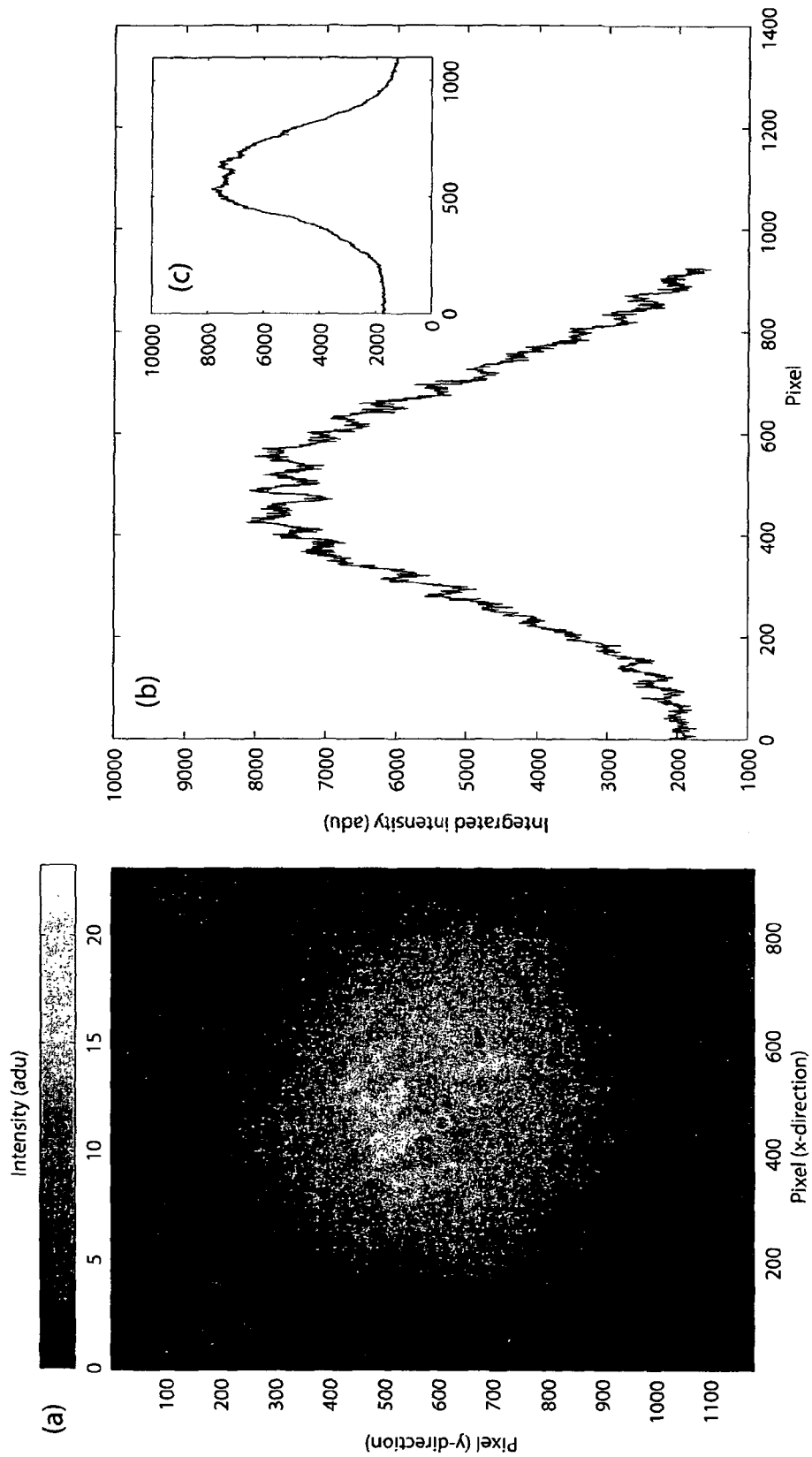
FIG. 5(a) illustrates an image obtained via the particle beam sensor of FIG. 1 with a different magnification.
FIG. 5(b) illustrates a line profile of the image of FIG. 5(a)
FIG. 5(c) illustrates a line profile of the image of FIG. 5(a) in a direction transverse to that associated with the line profile of FIG. 5(b)

FIG. 4a and FIG. 5a each illustrate the magnified image of the foot print of an X-ray beam constructed from pixel sensor signals generated by the CMOS image sensor 10 in response to formation of a magnified image 60 of a beam foot print 4 by the processes described above. In FIG. 4a, the magnification factor L/D=2.2, while in FIG. 5 the magnification factor, L/D=6. FIGS. 4b and 4c show, respectively, the horizontal (x-direction of FIG. 4a) and vertical (y-direction of FIG. 4a) intensity profiles, respectively, of the X-ray beam image of FIG. 4a. Similarly, FIGS. 5a and 5b, respectively, show the horizontal (x-direction of FIG. 5a) and vertical (y-direction of FIG. 5a) intensity profiles, respectively, of the X-ray beam image of FIG. 5a. The angle $\alpha$ in respect of FIGS. 4a and 5a was $\alpha$=23.8 degrees. The diameter of the single pinhole aperture employed was 100 µm.

Figure 6:
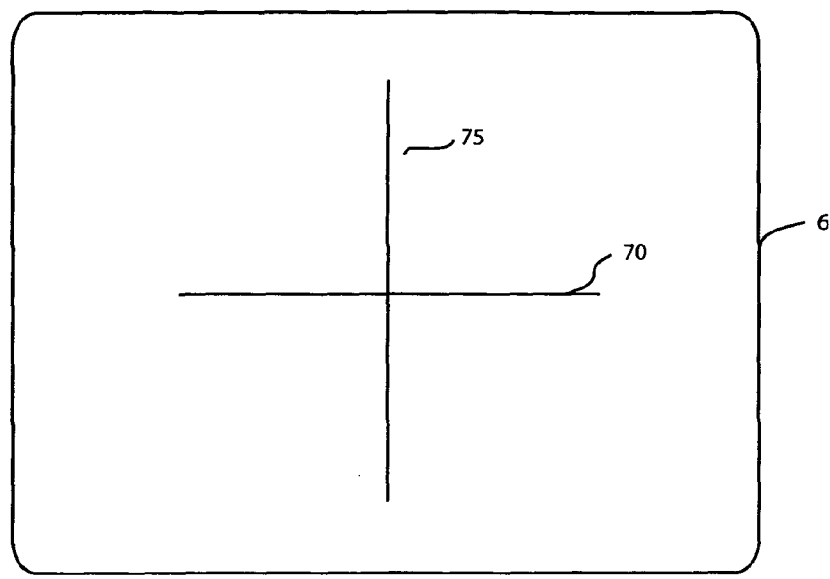
FIG. 6 illustrates a coded aperture mask.
Figure 7:
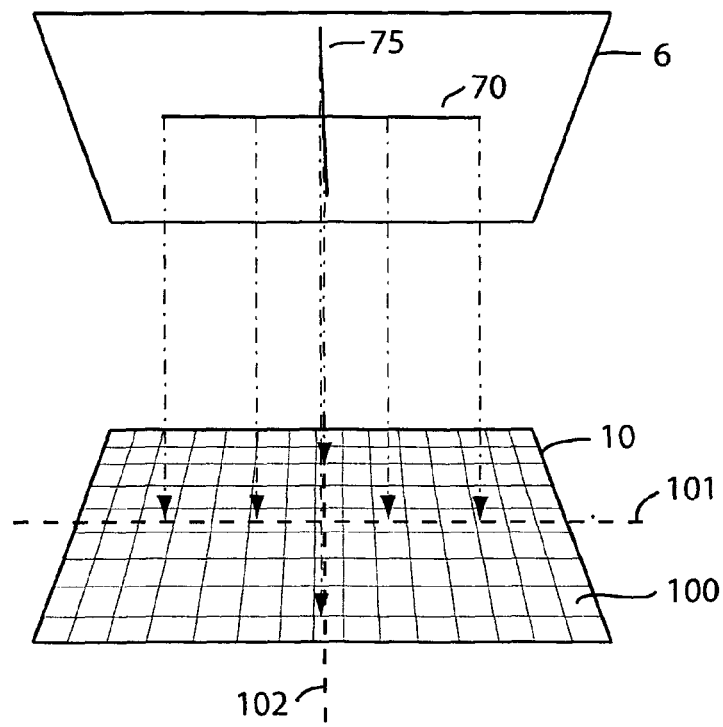
FIG. 7 illustrates, in exaggerated perspective view, the spatial relationship between the coded aperture of the coded aperture mask of FIG. 6, and the pixel sensor rows and columns of the pixel array employed to image a particle beam in an embodiment of the invention.

FIG. 6 and FIG. 7 illustrate an alternative embodiment in which the aperture mask is a coded aperture mask, aligned with rows and columns of pixel sensors of the sensor unit 8.

The scatter foil comprises a first slit aperture 70 of length 3 mm and width 10 µm bisecting (and bisected by) a second and transversely extending slit aperture 75 of length 3 mm and width 10 µm. The scatter foil is arranged relative to the CMOS image sensor pixel array 100 such that the first slit aperture is at least coplanar with, and preferably parallel to, the direction 101 in which the pixel rows of the image sensor extend. Similarly, the scatter foil is also arranged relative to the CMOS image sensor such that the second (transverse) slit aperture is at least coplanar with, and preferably parallel to, the direction 102 in which the pixel columns of the image sensor extend. FIG. 7 shows a schematic view of this arrangement with highly exaggerated perspective.

This alignment between coded aperture mask slits and the rows and columns of the pixel sensor array of the CMOS imager, can result in an efficient beam position detection arrangement with a reduced signal to noise ratio. The alignment ensures that image data is concentrated along pixel sensor rows and/or columns and thereby permits a rapid acquisition of a low-noise line profile signal calculated by simply summing the signals from a given column or row of pixel sensor signals as discussed with reference to FIG. 3 above. Rapid and accurate detection of beam movement is possible using the resulting profiles which may determine the location of the centroid of the image on the sensor array, and changes thereof. For example, the location/coordinates of the crossing of the transverse profiles may serve to indicate the location/coordinates of the centroid of the image on the sensor array. Other methods may be used to this end.

Figure 8:
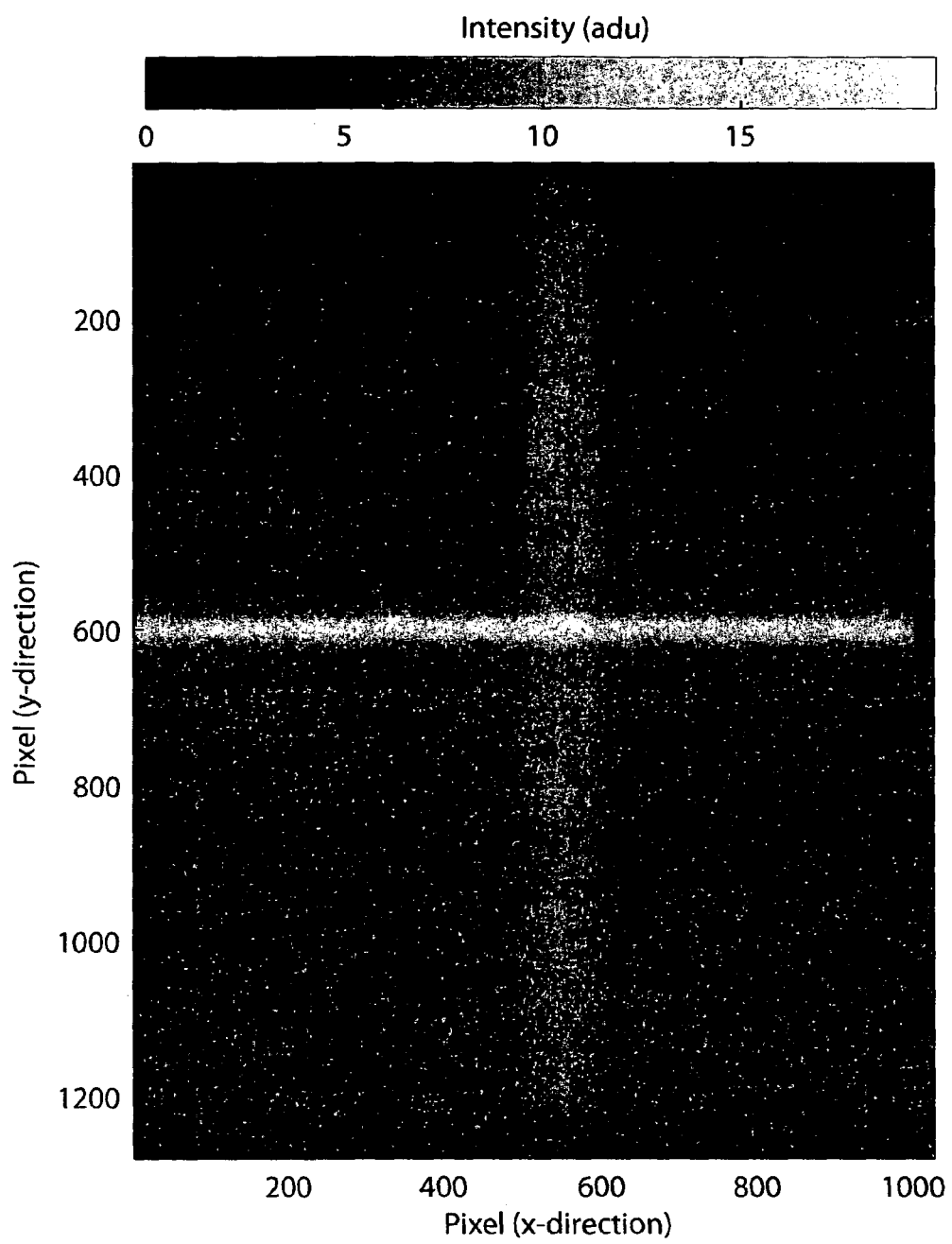
FIG. 8 illustrates an image obtained via the particle beam sensor convolved with the coded aperture pattern of the coded aperture mask of FIG. 6.

FIG. 8 illustrates the magnified and convolved (i.e. raw) image of the foot print of an X-ray beam, convolved with the cross-shaped aperture of the coded aperture mask 6, constructed from pixel sensor signals generated by the CMOS image sensor 10 in response to formation of a magnified mask-convolved image of a beam foot print 4 by the processes described above. The L/D ratio was approximately L/D=2. The angle $\alpha$ was $\alpha$=23.8 degrees.

The image is visually coded, as discussed above, to represent, using differing grey-scale values, the spatial distribution of differing pixel signal values generated across the pixel sensor array of the CMOS image sensor. In order to derive from this image an image of, or of a part of, the X-ray beam foot print 4, the image data shown in FIG. 8 was de-convolved using a Lucy-Richardson de-convolution routine, or other suitable de-convolution routine as would be readily apparent to the skilled person. The signal processor 13 is arranged to perform this task upon convolved image data 14 received thereby from the sensor unit 8, and to output the de-convolved image data 15 for use.

Figure 9:
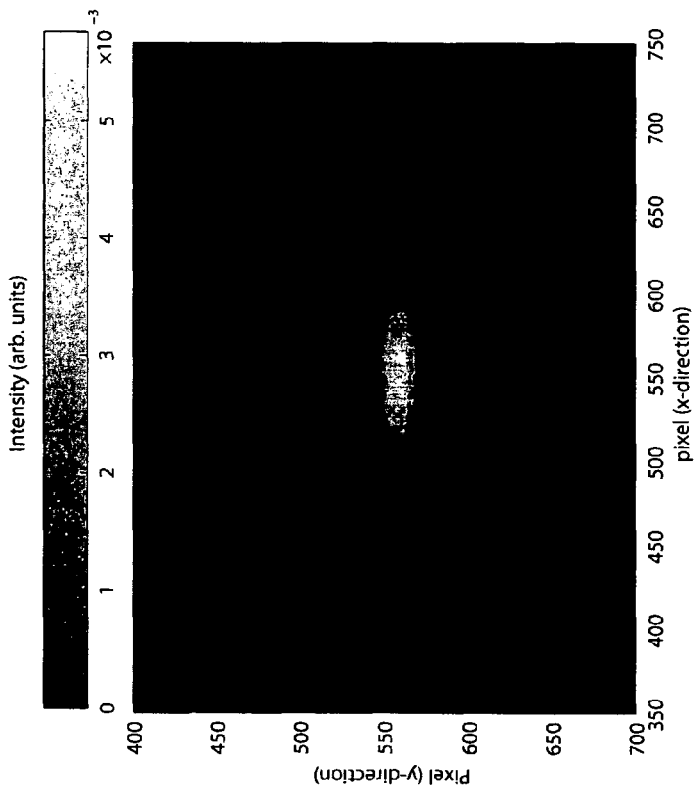
FIG. 9 illustrates the image of FIG. 8 de-convolved from the coded aperture pattern of FIG. 6.

FIG. 9 illustrates an image of the X-ray beam foot print 4 derived by de-convolution of the raw, convolved, image data 14 illustrated in FIG. 8 using the spatial distribution of the cross-shaped aperture (70, 75) of the aperture mask 6. FIGS. 10a and 10b illustrate the horizontal (x-direction of FIG. 9) and vertical (y-direction of FIG. 9) intensity profiles, respectively, of the X-ray beam image of FIG. 9.

The profile of FIG. 10a was obtained by summing the de-convolved pixel values associated with a common selected column of de-convolved image pixel coordinates to produce a data point on the graph. This process was repeated for all columns of de-convolved image pixels. The x-axis coordinate of each data point on the graph of FIG. 10a records the x-axis coordinate of the selected image column, and the y-axis coordinate of each data point records the value of the sum of de-convolved image pixel value for that column of image pixel.

The profile of FIG. 10b was obtained by summing the de-convolved pixel values associated with a common selected row of de-convolved image pixel coordinates to produce a data point on the graph. This process was repeated for all rows of de-convolved image pixels. The x-axis coordinate of each data point on the graph of FIG. 10b records the y-axis coordinate of the selected image row, and the y-axis coordinate of each data point records the value of the sum of de-convolved image pixel value for that row of image pixel.

Figure 11:
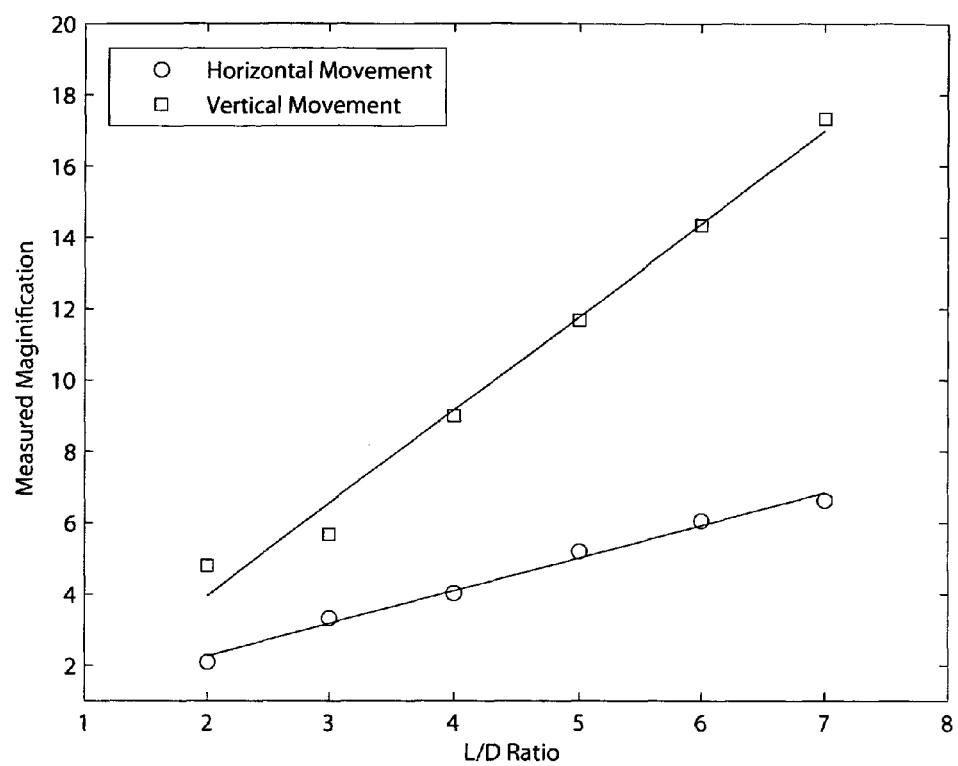
FIG. 11 illustrates factors of magnification in respect of the magnification of transverse X-ray beam displacements, versus the magnification factor L/D resulting from the geometry of the apparatus of FIG. 1a or FIG. 1b.

FIG. 11 graphically illustrates the magnification factors in respect of the magnification of transverse X-ray beam footprint displacements across a scattering foil, as a function of the geometrical magnification factor L/D resulting from the geometry of the apparatus of FIG. 1a or FIG. 1b. The magnification produced in the direction transverse to the plane containing the beam axis ("horizontal movement") results purely from the ratio L/D, whereas the magnification of displacement in a direction parallel to the plane containing the beam axis is proportional to $(L/D)(1/\tan(\alpha))$. Obliquity of the sensor means was set to $\beta$=0 degrees. It is to be noted that the mathematical expressions discussed above relating to magnification factors are, in practical terms, useful as only approximations, and that the exact factor of magnification may depart from this approximate expression slightly thereby requiring the calibration of magnification of the apparatus, if this is desired, as illustrated in FIG. 11.

Figure 12:
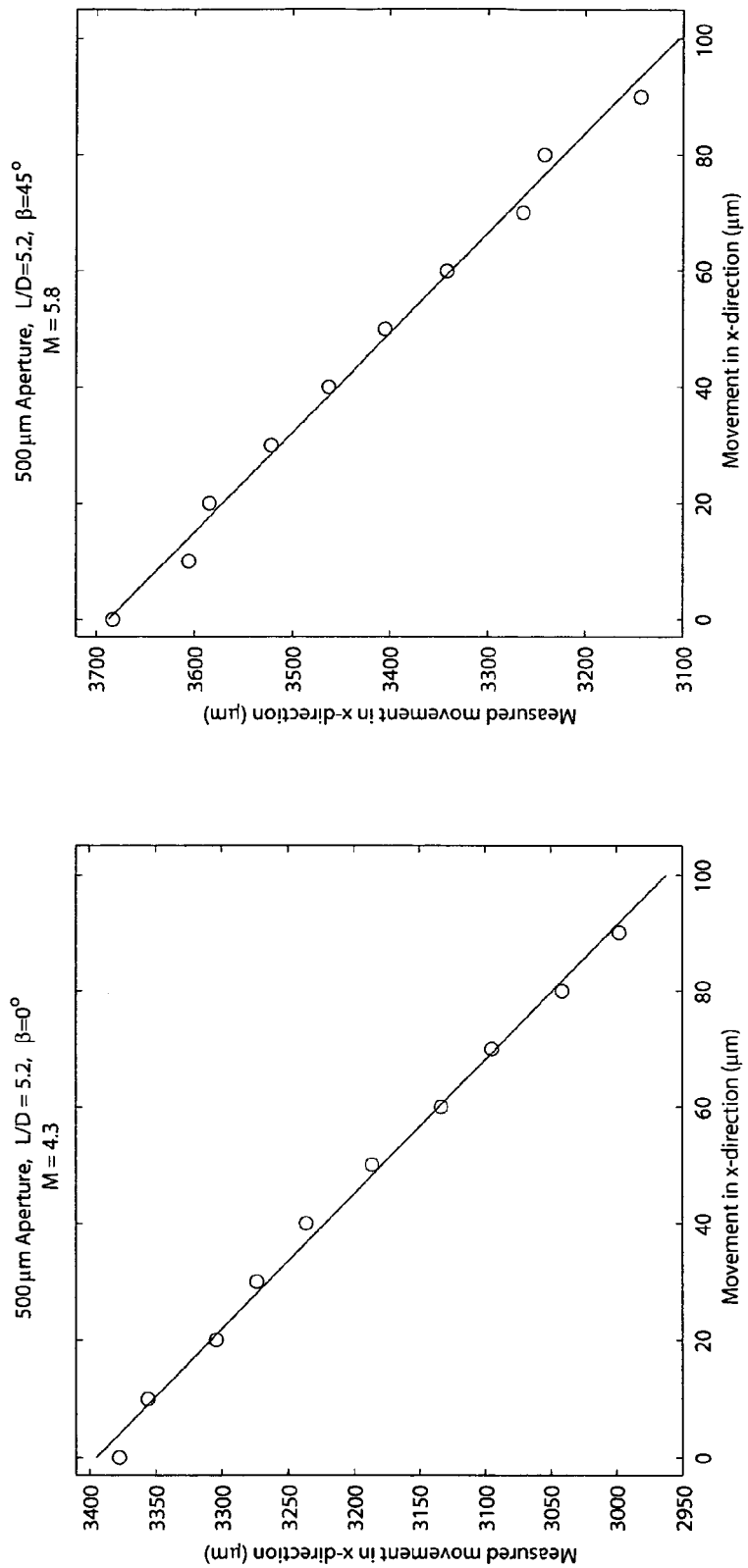
FIG. 12 illustrates factors of magnification in respect of the magnification of transverse X-ray beam displacements, versus the magnification factor L/D resulting from the geometry of the apparatus of FIG. 1b having an aperture mask comprising a single pinhole aperture of diameter 500 μm, and with β=0 degrees or β=45 degrees and L/D=5.2.

FIG. 12 preferably illustrates factors of magnification in respect of the magnification of transverse X-ray beam displacements, versus the magnification factor (L/D) resulting from the geometry of the apparatus of FIG. 1b having an aperture mask comprising a single pinhole aperture of diameter 500 µm, and with a fixed obliquity ($\alpha$) of scattering foil together with one of two values of obliquity of the sensor ($\beta$=0 degrees, or $\beta$=45 degrees). The geometrical magnification factor (L/D) in all cases was 5.2. It is seen that increase in obliquity of the sensor means from $\beta$=0 degrees to $\beta$=45 degrees, in the apparatus illustrated in FIG. 1b, results in an increase in magnification of a factor of approximately 1.3 which closely approximates the quantity $1/\cos(\beta)$.

There now follows a discussion of results of experiments conducted using the above embodiment of the invention to monitor an X-ray beam generated by a synchrotron machine.

The synchrotron machine generated a high-velocity pulse of electrons and confines the pulse to a circular path which passes through a controlled magnetic field. Each time the circulating electron pulse passes through the magnetic field they undergo acceleration due to their interaction with the magnetic field. This acceleration generated X-rays which are formed into an X-ray beam generally tangential to the circular path of the electron pulse. Periodically the electron pulse is "refilled" with fresh electrons to replace those depleted from the pulse over time. An X-ray beam generated in this way was monitored using an embodiment of the invention. The X-ray beam typically presented a cross-sectional area of several square micrometers to several square millimeters. The direction of the beam is steerable using elements (known as "optics" e.g. X-ray mirrors) of a beam line through which the beam passes. The following presents preliminary results from data collected at such an X-ray beam. Beam position measurements were taken. Long runs of measurements were taken to document the positional stability throughout a single machine run and including periods of refills.

The experiments were performed with a partially focussed X-ray beam at an X-ray particle energy of 12.7 keV and a focussed beam at X-ray particle energies of 16 keV and 19.2 keV.

A de-convoluted image of the beam obtained from the data collected by the BPM is shown in FIG. 9. The particle beam sensor employed to obtain this image was as described above with reference to FIGS. 8, 9 and 10.

Figure 10:
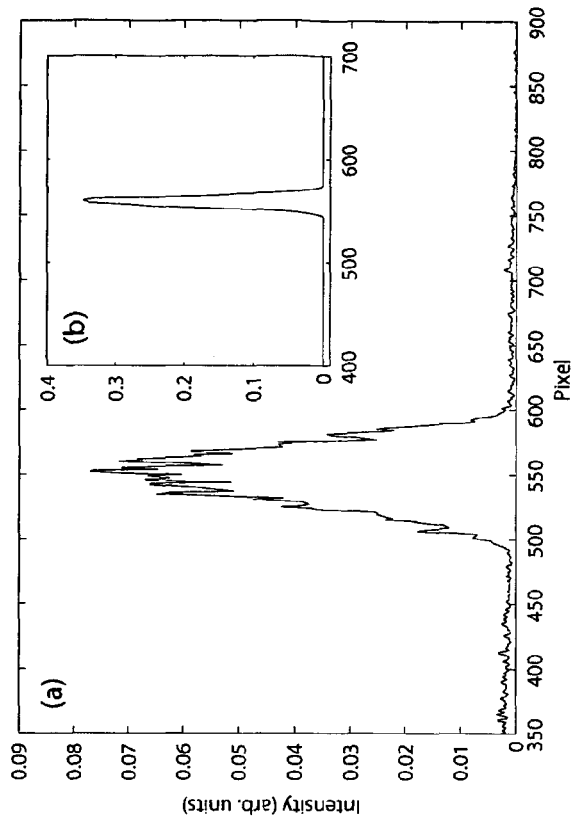
FIG. 10(a) illustrates a line profile of the image of FIG. 9.
FIG. 10(b) illustrates a line profile of the image of FIG. 9 in a direction transverse to that associated with the line profile of FIG. 10(a)

To measure beam position, long runs of the synchrotron machine were carried out with the particle beam sensor set up to measure the beam profile in the horizontal and vertical directions (see FIG. 10). From this data beam centre position, beam FWHM and amplitude of the beam profiles were determined.

FIG. 14(*a*) shows the amplitude of the horizontal beam profile during a refill. FIGS. 14(*b*) and 14(*c*) show the position of the centre of the beam in the horizontal and vertical direction, respectively. It is clear from the data that perturbations and drift occur in beam position during the refill. Beam swings of 10-20 µm in the horizontal beam position are measured shortly after the refill and correspond to a drop in intensity. Violent swings of up to 70 µm are measured in the vertical beam position during the same period. We speculate that in this brief period some machine adjustments/re-steering take place.

Figure 15:
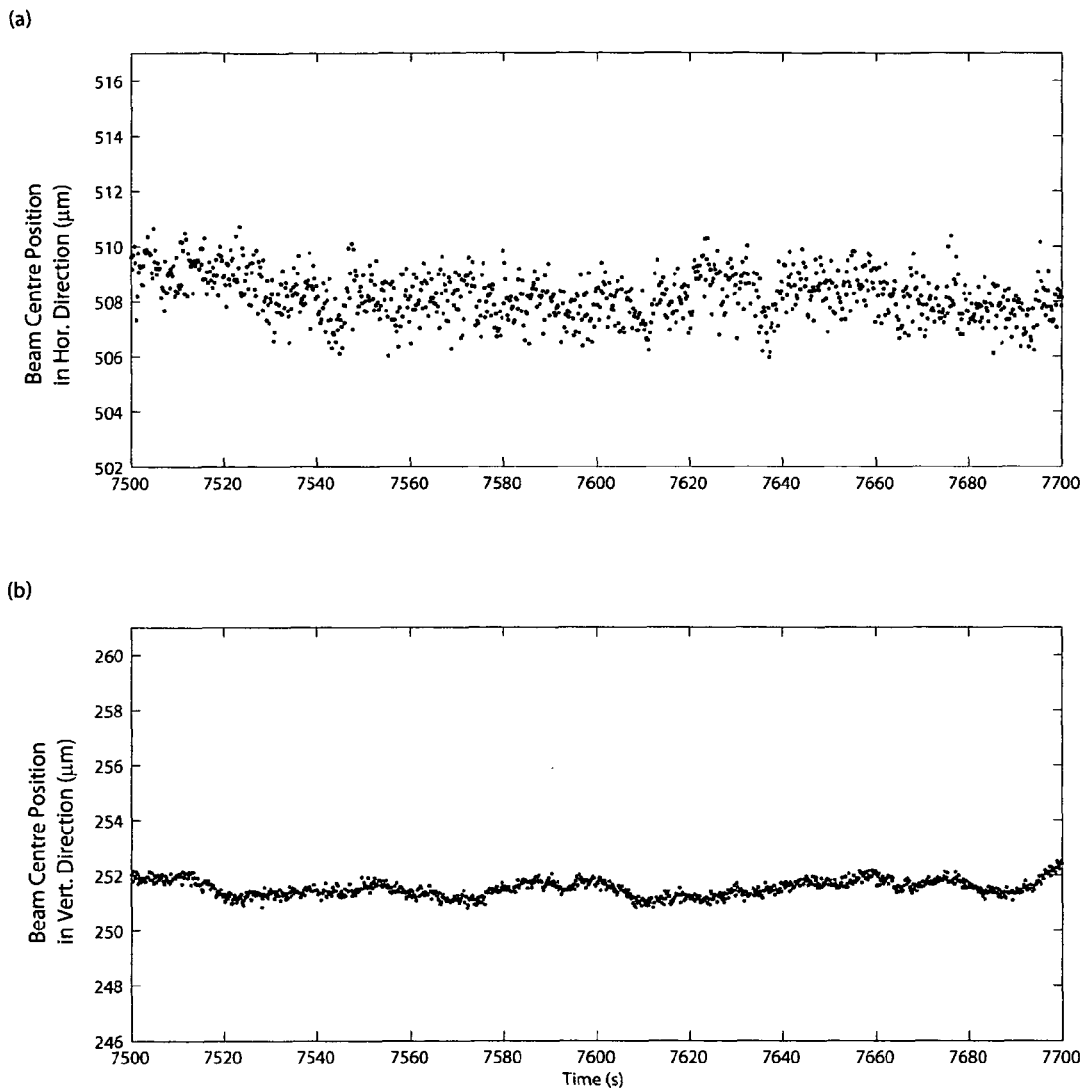

FIGS. 15(*a*) and 15(*b*) show a 200 second window of a section of the time scan shown in FIG. 14. The resolution of the particle beam sensor, based on the measured RMS noise level, is 865 nm and 300 nm in the horizontal and vertical directions, respectively. The particle beam sensor, when operating as a beam position monitor, in this experiment, could measure beam position changes of at least 300 nm.

In summary, the general methodology used to measure the intensity profile of an X-ray beam can be illustrated by drawing on an analogy from visible radiation. In order to determine beam position and the profile of a visible radiation beam, a beam splitter would be placed in the beam and a detector is placed in one of the emerging branches. In optics, one could use a suitably coated thin foil (Pellicle) placed at an angle of 45° to the incident beam that would reflect a small percentage of the incident beam at right angles. Unlike radiation in the visible range, the index of refraction in matter for X-rays is very close to unity and it is therefore very difficult to image the monochromatic beam by looking at its reflection without absorbing the main beam completely. However, if a beam of X-rays is incident on a scattering surface, such as a thin smooth (featureless) foil, then a small fraction of the incident beam will be elastically and Compton scattered in all directions by the electrons in the surface/foil. The total amount of radiation scattered merely depends on the beam flux and the density of the electrons in the path of the X-ray beam. Hence the thickness and type of the foil determines the percentage of the main beam that is scattered. For example, a 50 µm thick polyimide foil may absorb a mere 1% of the beam intensity for X-ray energies of about 12 keV. Other foils of interest (particularly for high intensity polychromatic sources) are graphite (SGL Carbon), Beryllium (Brush Wellman) and polycrystalline diamond (Element Six). Because the scattered X-rays will be distributed over all directions, the device and methods of the invention preferably are so arranged to enable imaging the footprint of the main beam on the foil.

A pinhole imaging technique may be employed, and this may result in high-resolution image of the beam projected on the scattering surface (foil). Such images may, however, be relatively weak and may not provide adequate time resolution. A so-called coded aperture may be used that consists of many pinholes or slits (or both) that are arranged in an accurately known pattern. The advantage of such an aperture is the high intensity images that contain the image convoluted by the pattern of the apertures. The original image is obtained after de-convolution with the known coded aperture and/or aperture pattern. A simple cross-shaped aperture has proven very successful.

In general, a photo diode detector array may be used to image the footprint formed on the scattering foil (e.g. a quad diode) and to receive an image via an aperture mask (e.g. coded aperture mask). A further magnification of any beam position change is easily obtained by a suitable choice of the ratio L/D. Any beam displacement $\delta$ is magnified by approximately the factor $M=L/D\times(1/\tan\alpha)$. This magnification could typically be between 1 and 100 times. Therefore, with use of a small number of large photodiodes a very high sensitivity for beam position change may be obtained. In order to get good signal to noise ratios at high readout frequencies, the use of a limited number of large area photodiodes is preferable. It is still possible to measure the beam centroid position accurately with a reduced number of large photodiodes. An example of such a detector is the ubiquitous quadrant (or quad) photodiode. This geometry with four individual photodiodes features the largest possible photodiode area of a 2D position sensitive device and is often used in visible light beam tracking applications. This type of arrangement is very sensitive to small fluctuations in beam position. A strip of interlocking triangularly shaped diodes or a matrix of square diodes—a repetition of the quad diode cell in two directions—may enlarge the positional measurement range significantly. A further detection method would be to decouple the two orthogonal directions of beam shifts by using two strips of rectangular photodiodes using two separate pinholes.

The embodiments and examples described above are non-limiting examples and variants or modifications of the embodiments such as would be readily apparent to the skilled person are encompassed within the scope of this invention (e.g. as defined by the claims).

The invention claimed is:

1. A particle beam sensor comprising:
 a scattering surface configured to intercept obliquely a path of an incident particle beam thereby to permit scattering of some particles from the incident particle beam by the scattering surface,
 a sensor responsive to receipt of one or more scattered particles to generate a sensor signal; and
 an aperture mask arranged between the scattering surface and the sensor and presenting to the scattering surface a screen opaque to said scattered particles and having an aperture through which an unobstructed view of the scattering surface is provided to the sensor, the aperture thereby being configured to permit selection of particles scattered by the scattering surface which are to be used to form at the sensor an image representative of at least a part of a foot print cast by the particle beam upon the scattering surface,
 wherein:
  a separation (D) between the aperture mask and the scattering surface viewable by the sensor through the aperture differs from a separation (L) between the aperture mask and the sensor, such that an area at the sensor able to be illuminated by the scattered particles differs from an area of the scattering surface able to illuminate the sensor with scattered particles;
  the sensor comprises an array of pixel sensors arranged relative to the aperture mask to provide a sensing surface upon which the image is formable, wherein the aperture mask is configured to provide selected particles through the aperture to a plurality of pixel sensors of the array of pixel sensors, each pixel sensor being responsive to receipt of a scattered particle to generate a pixel sensor signal; and
  the sensing surface is substantially planar and adjustable to adjust an obliquity with which the sensing surface is presented to the aperture mask thereby to adjust a size of the image formable on the sensing surface.

2. A particle beam sensor according to claim 1 in which the aperture mask is moveable relative to the scattering surface such that the separation (D) between the aperture mask and the scattering surface viewable by the sensor through the aperture is adjustable thereby to scale said image formed at the sensor.

3. A particle beam sensor according to claim 1 in which the aperture mask is moveable relative to the sensor, or vice versa, such that the separation (L) between the aperture mask and the sensor is adjustable thereby to scale said image formed at the sensor.

4. A particle beam sensor according to claim 1 in which the scattering surface is substantially planar and presented to the aperture mask with an obliquity adjustable with respect to the particle beam, thereby to adjust the size of the particle beam foot print formed thereupon.

5. A particle beam sensor according to claim 1 in which the scattering surface is pivotable about a first axis to adjust said obliquity, and the sensing surface is pivotable about a second axis transverse to the first axis to adjust its obliquity.

6. A particle beam sensor according to claim 1 in which the aperture of the aperture mask comprises a linear slit which extends in a line substantially parallel with a row or a column of pixel sensors of the sensor.

7. A particle beam sensor according to claim 6, further including a pixel signal processor configured to sum pixel sensor signals generated by pixel sensors along a row or column of the sensor and to provide a result as a summed pixel signal.

8. A particle beam sensor according to claim 6, wherein the aperture includes two linear slits bisecting each other at right angles to form a symmetrical cross.

9. A particle beam sensor according to claim 8 wherein the linear slits are parallel to an array of pixels of the sensor.

10. A particle beam sensor according to claim 1 including de-convolution means for deconvolving, according to the shape or pattern of the aperture of the aperture mask, pixel sensor signals generated by the sensor in response to formation upon the sensor of said image via said aperture mask thereby to generate image pixel values which collectively define the image of said foot print.

11. A particle beam sensor according to claim 1, wherein the aperture of the aperture mask is the only aperture in the aperture mask.

12. A particle beam generator apparatus operable to generate a particle beam the apparatus including:
 a particle beam sensor according to any preceding claim in which the scattering surface is constructed and arranged to intercept obliquely a beam path along which the particle beam generator directs the beam of particles to permit a scattering of particles from the scattering surface.

13. A particle beam generator apparatus according to claim 12, further including feedback means for controlling contemporaneously the beam generator apparatus to adjust properties of the particle beam according to sensor signals generated by the sensor.

14. A method for particle beam sensing comprising:
 providing a scattering surface;
 intercepting obliquely, with the scattering surface, a path of a particle beam thereby to permit a scattering of particles from the particle beam by the scattering surface, wherein the scattering surface intercepts the particle beam without significantly interrupting the particle beam;
 providing a sensor responsive to receipt of one or more said scattered particles;
 generating a sensor signal;
 providing an aperture mask arranged between the scattering surface and the sensor;
 presenting to the scattering surface a screen opaque to said scattered particles and having a single aperture through which an unobstructed view of the scattering surface is provided to the sensor; and
via the single aperture, selecting the scattered particles to be used to form at the sensor an image representative of at least a part of a foot print cast by the particle beam upon the scattering surface,
 wherein a separation (D) between the aperture mask and the scattering surface viewable by the sensor through the aperture differs from a separation (L) between the aperture mask and the sensor, such that an area at the sensor that is able to be illuminated by particles scattered from the scattering surface differs from an area of the scattering surface able to illuminate the sensor with scattered particles, and wherein the sensor is provided with a substantially planar array of pixel sensors defining a sensing surface, wherein the aperture mask is configured to provide selected particles through the aperture to a plurality of pixel sensors of the array of pixel sensors, and the method further includes changing an obliquity with which the sensing surface is presented to the aperture mask, thereby to change a size of the image formed on the sensing surface.

15. A method according to claim 14 including changing a separation (D) between the aperture mask and the scattering surface viewable by the sensor through the aperture mask to scale said image formed at the sensor.

16. A method according to claim 14, further including changing the separation (L) between the aperture mask and the sensor thereby to change the scale of said image formed at the sensor.

17. A method according to claim 14, further including pivoting the scattering surface about a first axis to adjust its said obliquity, and/or pivoting the sensing surface of the sensor means about a second axis transverse to the first axis to adjust its said obliquity.

18. A method according to claim 14 including, providing the aperture mask with at least one linear slit which extends substantially in parallel with a row or a column of pixel sensors of the sensor, summing pixel sensor signals generated by the pixel sensors along said row or column of the sensor to obtain a result, and providing the result as a summed pixel signal.

\* \* \* \* \*